US012335100B2

(12) United States Patent
Kim et al.

(10) Patent No.: US 12,335,100 B2
(45) Date of Patent: Jun. 17, 2025

(54) SERVER AVAILABILITY CHECKING FOR EDGE COMPUTING SERVICES

(71) Applicant: QUALCOMM Incorporated, San Diego, CA (US)

(72) Inventors: Sunghoon Kim, San Diego, CA (US); Nishant Gupta, Bangalore (IN); Dario Serafino Tonesi, San Diego, CA (US); Alan Soloway, Erie, CO (US); Tom Chin, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/728,948

(22) Filed: Apr. 25, 2022

(65) Prior Publication Data

US 2023/0239215 A1 Jul. 27, 2023

(30) Foreign Application Priority Data

Jan. 21, 2022 (IN) .............................. 202241003526

(51) Int. Cl.
*H04L 41/12* (2022.01)
*H04L 67/141* (2022.01)

(52) U.S. Cl.
CPC ............ *H04L 41/12* (2013.01); *H04L 67/141* (2013.01)

(58) Field of Classification Search
None
See application file for complete search history.

(56) References Cited

U.S. PATENT DOCUMENTS

| 7,177,947 | B1* | 2/2007 | Herzog | H04L 61/4552 |
| | | | | 709/245 |
| 2010/0235441 | A1* | 9/2010 | Christian | H04L 45/586 |
| | | | | 709/223 |
| 2020/0112848 | A1* | 4/2020 | Palaniappan | H04W 76/16 |
| 2021/0111953 | A1* | 4/2021 | Hall | H04L 67/563 |

(Continued)

FOREIGN PATENT DOCUMENTS

| WO | WO-2020231120 A1 * | 11/2020 | ............. H04L 67/16 |
| WO | WO-2021138309 A1 * | 7/2021 | ............. H04L 67/60 |

OTHER PUBLICATIONS

Convida Wireless LLC, et al., "EAS Selection Synchronization Solution", 3GPP TSG-SA WG6 Meeting #46, S6-212712 (revision of S6-212682 rev 3), e-meeting, Nov. 15-23, 2021, 8 pages.

*Primary Examiner* — Tonia L Dollinger
*Assistant Examiner* — Ishrat Rashid
(74) *Attorney, Agent, or Firm* — Holland & Hart LLP

(57) ABSTRACT

Methods, systems, and devices for wireless communications are described. Generally, the described techniques provide for identifying edge application servers (EASs) to support one or more services of an application client (AC) running on a user equipment (UE). An AC of a UE may send a request for an edge enabler client (EEC) of the UE to identify one or more EASs for one or more services of the AC. The EEC may receive the request and may perform an EAS discovery procedure to identify the one or more EASs. The EEC may then send a response to the AC including identifiers of the one or more EASs (e.g., if the EAS discovery procedure indicated that these EASs are available). Once the AC receives the response, the AC may connect to each EAS of the EASs indicated by the EEC to support a corresponding service of the AC.

21 Claims, 11 Drawing Sheets

(56) References Cited

U.S. PATENT DOCUMENTS

2021/0307089 A1\* 9/2021 Kim ................ H04W 4/50
2023/0156094 A1\* 5/2023 Hergenhan ............ H04L 67/51
709/227

\* cited by examiner

SERVER AVAILABILITY CHECKING FOR EDGE COMPUTING SERVICES

CROSS REFERENCE

The present application for patent claims the benefit of India Provisional Patent Application No. 202241003526 by KIM et al., entitled "SERVER AVAILABILITY CHECKING FOR EDGE COMPUTING SERVICES," filed Jan. 21, 2022, assigned to the assignee hereof, and expressly incorporated by reference herein.

FIELD OF TECHNOLOGY

The following relates to wireless communications, including server availability checking for edge computing services.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support edge computing where a UE may communicate with a wireless network via distributed servers. These distributed servers (e.g., in conjunction with one or more central servers) may facilitate communications with the wireless network to support services running on application clients (ACs) at the UE. Improved techniques for supporting edge computing at a UE may be desirable.

SUMMARY

The described techniques relate to improved methods, systems, devices, and apparatuses that support server availability checking for edge computing services. Generally, the described techniques provide for identifying edge application servers (EASs) to support one or more services of an application client (AC) running on a user equipment (UE). An AC of a UE may send a request for an edge enabler client (EEC) of the UE to identify one or more EASs for one or more services of the AC. The EEC may receive the request and may perform an EAS discovery procedure to identify the one or more EASs. The EEC may then send a response to the AC including identifiers of the one or more EASs (e.g., if the EAS discovery procedure indicated that these EASs are available). Once the AC receives the response, the AC may connect to each EAS of the EASs indicated by the EEC to support a corresponding service of the AC.

A method for wireless communication at a user equipment (UE) is described. The method may include receiving, from an application client of the UE at an edge enabler client of the UE, a request to identify one or more edge application servers for one or more services of the application client, performing, at the edge enabler client, a discovery procedure to identify the one or more edge application servers based on receiving the request, and sending, to the application client from the edge enabler client, a response to the request based on performing the discovery procedure.

An apparatus for wireless communication at a UE is described. The apparatus may include a processor, memory coupled with the processor, and instructions stored in the memory. The instructions may be executable by the processor to cause the apparatus to receive, from an application client of the UE at an edge enabler client of the UE, a request to identify one or more edge application servers for one or more services of the application client, perform, at the edge enabler client, a discovery procedure to identify the one or more edge application servers based on receiving the request, and send, to the application client from the edge enabler client, a response to the request based on performing the discovery procedure.

Another apparatus for wireless communication at a UE is described. The apparatus may include means for receiving, from an application client of the UE at an edge enabler client of the UE, a request to identify one or more edge application servers for one or more services of the application client, means for performing, at the edge enabler client, a discovery procedure to identify the one or more edge application servers based on receiving the request, and means for sending, to the application client from the edge enabler client, a response to the request based on performing the discovery procedure.

A non-transitory computer-readable medium storing code for wireless communication at a UE is described. The code may include instructions executable by a processor to receive, from an application client of the UE at an edge enabler client of the UE, a request to identify one or more edge application servers for one or more services of the application client, perform, at the edge enabler client, a discovery procedure to identify the one or more edge application servers based on receiving the request, and send, to the application client from the edge enabler client, a response to the request based on performing the discovery procedure.

In some examples of the method, apparatuses, and non-transitory computer-readable medium described herein, receiving the request to identify the one or more edge application servers may include operations, features, means, or instructions for receiving a list of domain names for which to identify the one or more edge application servers, where performing the discovery procedure includes and performing the discovery procedure using the list of domain names.

Some examples of the method, apparatuses, and non-transitory computer-readable medium described herein may further include operations, features, means, or instructions for receiving, at the edge enabler client from an edge enabler server, identifiers associated with a set of edge application servers based on performing the discovery procedure, matching each domain name of at least a subset of the list of domain names to a respective edge application server in the set of edge application servers, and sending, in the response to the application client, an indication of the respective edge application server matched to each domain name.

Some examples of the method, apparatuses, and non-transitory computer-readable medium described herein may further include operations, features, means, or instructions for storing the list of domain names for which the edge enabler client may be to identify the one or more edge application servers and performing another discovery procedure using the list of domain names based on a change in location of the UE, an update to availability of the one or more edge application servers for the one or more services of the application client, or a combination thereof.

In some examples of the method, apparatuses, and non-transitory computer-readable medium described herein, performing the discovery procedure may include operations, features, means, or instructions for identifying, at the edge enabler client, a profile of the application client in the request from the application client and performing the discovery procedure to identify the one or more edge application servers based on the identifying.

Some examples of the method, apparatuses, and non-transitory computer-readable medium described herein may further include operations, features, means, or instructions for receiving, at the edge enabler client from an edge enabler server, identifiers associated with a set of edge application servers based on performing the discovery procedure and sending, in the response to the application client, an indication of the set of edge application servers received from the edge enabler server.

Some examples of the method, apparatuses, and non-transitory computer-readable medium described herein may further include operations, features, means, or instructions for determining that the discovery procedure failed to return an edge application server for at least one of the one or more services of the application client, performing, at the edge enabler client, a domain name system procedure to identify another server for the at least one of the one or more services of the application client based on the determining, and sending, in the response to the request, the internet protocol address of the other server based on performing the domain name system procedure.

A method for wireless communication at a UE is described. The method may include sending, from an application client of the UE to an edge enabler client of the UE, a request to identify one or more edge application servers for one or more services of the application client, receiving, at the application client from the edge enabler client, a response to the request including at least one of the one or more edge application servers, and connecting to the at least one edge application server based on receiving the response.

An apparatus for wireless communication at a UE is described. The apparatus may include a processor, memory coupled with the processor, and instructions stored in the memory. The instructions may be executable by the processor to cause the apparatus to send, from an application client of the UE to an edge enabler client of the UE, a request to identify one or more edge application servers for one or more services of the application client, receive, at the application client from the edge enabler client, a response to the request including at least one of the one or more edge application servers, and connect to the at least one edge application server based on receiving the response.

Another apparatus for wireless communication at a UE is described. The apparatus may include means for sending, from an application client of the UE to an edge enabler client of the UE, a request to identify one or more edge application servers for one or more services of the application client, means for receiving, at the application client from the edge enabler client, a response to the request including at least one of the one or more edge application servers, and means for connecting to the at least one edge application server based on receiving the response.

A non-transitory computer-readable medium storing code for wireless communication at a UE is described. The code may include instructions executable by a processor to send, from an application client of the UE to an edge enabler client of the UE, a request to identify one or more edge application servers for one or more services of the application client, receive, at the application client from the edge enabler client, a response to the request including at least one of the one or more edge application servers, and connect to the at least one edge application server based on receiving the response.

Some examples of the method, apparatuses, and non-transitory computer-readable medium described herein may further include operations, features, means, or instructions for sending, in the request, a list of domain names for which the edge enabler client may be to identify the one or more edge application servers and receiving, in the response, an indication of a respective edge application server matched to each domain name of at least a subset of the list of domain names.

Some examples of the method, apparatuses, and non-transitory computer-readable medium described herein may further include operations, features, means, or instructions for identifying the list of domain names to include in the request based on one or more services in the application client marked as edge computing services.

Some examples of the method, apparatuses, and non-transitory computer-readable medium described herein may further include operations, features, means, or instructions for displaying, in the application client as edge computing services, the one or more services corresponding to the list of domain names included in the request.

Some examples of the method, apparatuses, and non-transitory computer-readable medium described herein may further include operations, features, means, or instructions for determining that the list of domain names for which the edge enabler client may be to identify the one or more edge application servers may be refreshed in the application client and sending, from the application client to the edge enabler client, another request including the refreshed list of domain names for which the edge enabler client may be to identify the one or more edge application servers based on the determining.

Some examples of the method, apparatuses, and non-transitory computer-readable medium described herein may further include operations, features, means, or instructions for sending, in the request, an indication of a profile of the application client, receiving, in the response, identifiers associated with a set of edge application servers available for the application client based on sending the indication, and matching each service of a subset of the one or more services to a respective edge application server in the set of edge application servers.

Some examples of the method, apparatuses, and non-transitory computer-readable medium described herein may further include operations, features, means, or instructions for displaying, in the application client as edge computing services, the subset of the one or more services matched to edge application servers in the set of edge application servers.

A method for wireless communication at a UE is described. The method may include receiving, from an application client of the UE at an edge enabler client of the UE, a request to perform a domain name system procedure using a domain name associated with a service of the application client, where the edge enabler client operates as a domain name system client, performing, at the edge enabler client, a discovery procedure to identify an edge application server for the service of the application client based on receiving the request, and sending, to the application client from the edge enabler client, a response to the request indicating an internet protocol address of the edge application server for the service of the application client or an internet protocol address of another server for the service of the application client.

An apparatus for wireless communication at a UE is described. The apparatus may include a processor, memory coupled with the processor, and instructions stored in the memory. The instructions may be executable by the processor to cause the apparatus to receive, from an application client of the UE at an edge enabler client of the UE, a request to perform a domain name system procedure using a domain name associated with a service of the application client, where the edge enabler client operates as a domain name system client, perform, at the edge enabler client, a discovery procedure to identify an edge application server for the service of the application client based on receiving the request, and send, to the application client from the edge enabler client, a response to the request indicating an internet protocol address of the edge application server for the service of the application client or an internet protocol address of another server for the service of the application client.

Another apparatus for wireless communication at a UE is described. The apparatus may include means for receiving, from an application client of the UE at an edge enabler client of the UE, a request to perform a domain name system procedure using a domain name associated with a service of the application client, where the edge enabler client operates as a domain name system client, means for performing, at the edge enabler client, a discovery procedure to identify an edge application server for the service of the application client based on receiving the request, and means for sending, to the application client from the edge enabler client, a response to the request indicating an internet protocol address of the edge application server for the service of the application client or an internet protocol address of another server for the service of the application client.

A non-transitory computer-readable medium storing code for wireless communication at a UE is described. The code may include instructions executable by a processor to receive, from an application client of the UE at an edge enabler client of the UE, a request to perform a domain name system procedure using a domain name associated with a service of the application client, where the edge enabler client operates as a domain name system client, perform, at the edge enabler client, a discovery procedure to identify an edge application server for the service of the application client based on receiving the request, and send, to the application client from the edge enabler client, a response to the request indicating an internet protocol address of the edge application server for the service of the application client or an internet protocol address of another server for the service of the application client.

Some examples of the method, apparatuses, and non-transitory computer-readable medium described herein may further include operations, features, means, or instructions for determining that the discovery procedure failed to return the edge application server for the service of the application client, performing the domain name system procedure to identify the other server for the service of the application client based on the determining, and sending, in the response to the request, the internet protocol address of the other server for the service of the application client based on performing the domain name system procedure.

In some examples of the method, apparatuses, and non-transitory computer-readable medium described herein, the application client uses the response from the edge enabler client including the internet protocol address of the edge application server or the internet protocol address of the other server as a domain name system procedure resolution.

DETAILED DESCRIPTION

Some wireless communications systems may support edge computing where a UE may communicate with a wireless network via distributed servers. These distributed servers may be referred to as edge application servers (EASs) and may bring computing power and storage closer to the UE to minimize the latency of communications and other operations at the UE. A UE may connect to one or more edge application servers (EASs) to support edge computing services at application clients (ACs) running on the UE. An edge enabler client (EEC) of the UE may facilitate edge computing and may perform EAS discovery procedures to identify EASs for an AC.

In some cases, it may be appropriate for an AC to connect to a specific EAS for a service of the AC. However, the EEC of the UE may be unable to identify an appropriate EAS for the service. Without an interface between the AC and the EEC, the EEC may simply identify an EAS for a service of the AC based on a profile of the AC. In some examples, the EEC may access the AC profile stored on the UE, or the EEC may intercept a request or other traffic from the AC to determine the AC profile. In any case, if the EEC identifies an EAS for the AC based on the AC profile and without specific instruction from the AC, the EAS identified by the EEC may be unsuitable for a specific service of the AC. Thus, the AC may be unable to communicate with an EAS to support the service, and the AC may be unable to utilize or benefit from edge computing.

As described herein, a wireless communications system may support efficient techniques for identifying EASs to support edge computing for services of an AC running on a UE. An AC of a UE may send a request for an EEC of the UE to identify one or more EASs for one or more services of the AC. The AC may send the request and expect a response to the request over an EDGE-5 interface with the EEC. The EEC may receive the request and may perform an EAS discovery procedure to identify the one or more EASs. The EEC may then send a response to the AC including identifiers of the one or more EASs (e.g., if the EAS discovery procedure indicated that these EASs are available). Once the AC receives the response, the AC may connect to each EAS of the EASs indicated by the EEC to support a corresponding service of the AC.

Aspects of the disclosure are initially described in the context of wireless communications systems. Examples of processes and signaling exchanges that support server availability checking for edge computing services are then described. Aspects of the disclosure are further illustrated by and described with reference to apparatus diagrams, system diagrams, and flowcharts that relate to server availability checking for edge computing services.

Figure 1:
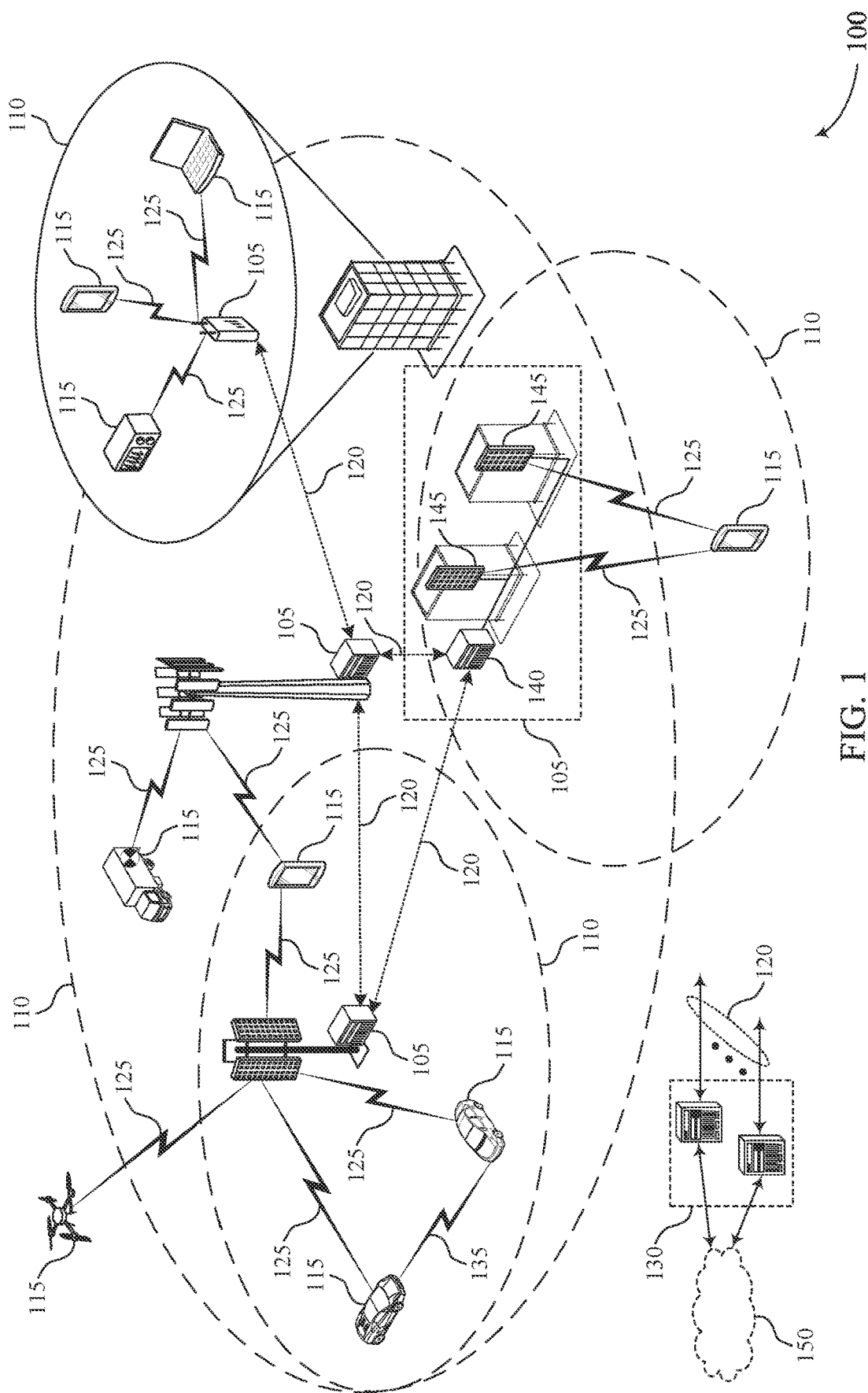
FIG. 1 illustrates an example of a wireless communications system that supports server availability checking for edge computing services in accordance with aspects of the present disclosure.

FIG. 1 illustrates an example of a wireless communications system 100 that supports server availability checking for edge computing services in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. Base stations 105 may be implemented using one or more network entities. A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE. LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems may support edge computing where a UE 115 may communicate with a wireless network via distributed servers. These distributed servers may be referred to as EASs and may bring computing power and storage closer to the UE 115 to minimize the latency of wireless communications and other operations at the UE 115. A UE 115 may connect to one or more EASs to facilitate edge computing for services provided by ACs running on the UE 115. An EEC of the UE 115 may facilitate edge computing and may perform EAS discovery procedures to identify EASs for an AC. The EEC may operate at an edge enabler layer at the UE 115 which may be between an application layer and a transport layer at the UE 115. In an EAS discovery procedure, the EEC may communicate with an edge enabler server (EES) to identify EASs for an AC of a UE 115. For instance, the EEC may send an a fully qualified domain name (FQDN) or other information to the EES, and the EES may use the FQDN or other information to identify an EAS to provide to the EEC. Thus, the EEC may perform EAS discovery and may retrieve EAS endpoint information (e.g., a uniform resource identifier (URI), an FQDN, or an Internet Protocol (IP) address). The EEC may then expose the EAS endpoint information of an EAS to an AC so that the AC may establish contact with the EAS. An FQDN may be a domain name that specifies a specific location in the tree hierarchy of the Domain Name System (DNS).

In some cases, it may be appropriate for an AC to connect to a specific EAS for a corresponding service of the AC. However, the EEC of the UE 115 may be unable to identify an appropriate EAS for the service. In particular, communications between the AC and the EEC (e.g., how the AC is involved in an EAS discovery procedure) may be unspecified. Further, an AC may be unaware of EDGEAPP features (e.g., edge computing features) available at a UE 115, and an EEC may facilitate edge computing services according to a specific implementation. In some examples, because communications between the AC and the EEC may be unspecified, the EEC may identify an EAS for a service of an AC based on a profile of the AC. In such examples, the EAS identified by the EEC may be unsuitable for the service of the AC. Thus, the AC may be unable to communicate with an EAS to support the service, and the AC may be unable to utilize or benefit from edge computing.

As an example, when an AC (e.g., an application) is launched at a UE 115, the AC may query a DNS with an FQDN configured in the AC. After the UE receives an identifier (e.g., IP address) of an application server (AS) (e.g., after IP address resolution), the AC may attempt to connect to the AS. While the AC is running on the UE 115, the AC or a user may trigger an edge computing service (e.g., using application-level logic), and the AC may query the DNS with an FQDN for the edge computing service. However, it may not be guaranteed that the EAS FQDN exposed by the EEC corresponds to the edge computing service (e.g., is suitable for the AC to access when the AC is running on the UE 115). That is, without appropriate communication between the AC and the EEC, an EAS identified by the EEC may be unsuitable for the edge computing service triggered by the AC or the user.

Because an EAS FQDN exposed by an EEC to an AC after an EAS discovery procedure may not match with an FQDN configured in the AC (e.g., for a particular service), the result of the EAS discovery procedure may be unsuitable for use. Further, the EEC may not be able to determine which FQDNs to use to identify EASs for an AC during an EAS discovery procedure (e.g., the FQDNs for which the AC is interested in finding EASs in an EAS discovery procedure). Wireless communications system 100 may support efficient techniques for identifying EASs for one or more services provided by an AC to allow these services to utilize edge computing. Using the techniques described herein, an AC may communicate directly with an EEC to coordinate an efficient EAS discovery procedure that may return identifiers for EASs that may support edge computing services at the AC.

Figure 2:
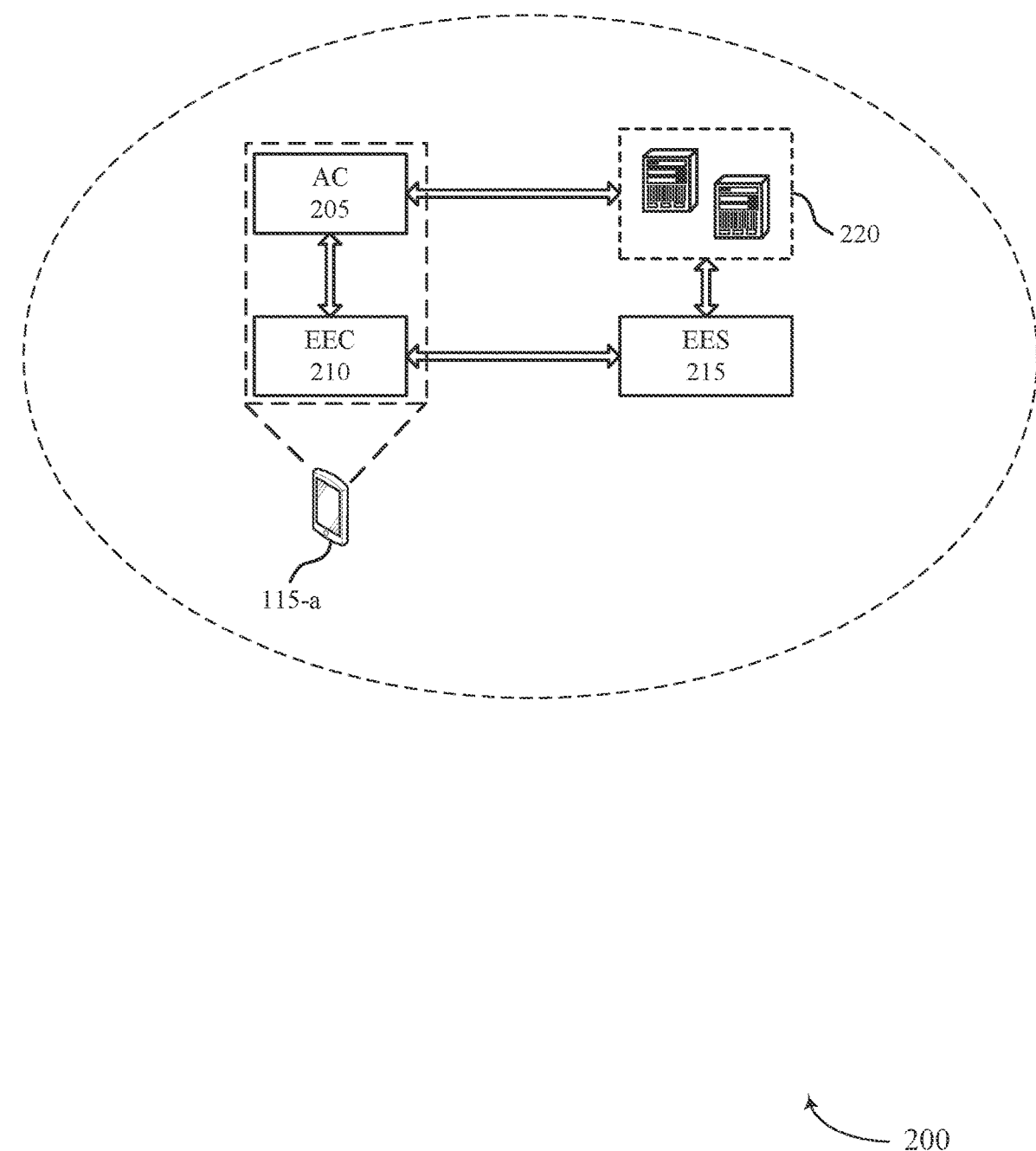
FIG. 2 illustrates an example of a wireless communications system that supports server availability checking for edge computing services in accordance with aspects of the present disclosure.

FIG. 2 illustrates an example of a wireless communications system 200 that supports server availability checking for edge computing services in accordance with aspects of the present disclosure. The wireless communications system 200 includes a UE 115-*a*, which may be an example of a UE 115 described with reference to FIG. 1. The UE 115-*a* may include an AC 205 and an EEC 210. The EEC 210 may communicate with an EES 215 in a network (e.g., EES 215 may be included in or coupled with a core network 130 of a wireless communications network 100) to perform EAS discovery procedures to identify EASs 220 for edge computing services on the AC 205. The AC 205 may then communicate with the EASs 220 to support these edge computing services. The wireless communications system 200 may implement aspects of the wireless communications system 100. For example, the wireless communications system 200 may support efficient techniques for identifying EASs 220 for one or more services provided by the AC 205 to allow these services to utilize edge computing.

The AC 205 may send a request to the EEC 210 for the EEC 210 to identify EASs 220 for one or more edge computing services provided by the AC 205. For instance, the AC 205 or a user may trigger an edge computing service at the AC 205, and the AC 205 may send the request to the EEC 210. In some examples, the AC 205 may include information in the request that the EEC 210 may use to perform an EAS discovery procedure to identify the EASs for the one or more edge computing services. The AC 205 may communicate with the EEC 210 over an EDGE-5 application programming interface (API). The EEC 210 may then coordinate with the EES 215 (e.g., via wireless communications system 100) to perform the EAS discovery procedure, and the EEC 210 may return identifiers of the EASs to the AC 205 (e.g., if the EASs are determined to be available during the EAS discovery procedure). The AC 205 may then connect to the EASs using the identifiers to facilitate the one or more edge computing services at the AC 205.

In one aspect, the AC 205 may provide a list of FQDNs corresponding to services provided by the AC 205 to the EEC 210 for the EEC 210 to use to identify EASs for the AC 205. That is, the AC 205 may invoke an EDGE-5 API to check which FQDNs are available for edge computing (e.g., available with EDGEAPP). In this aspect, an EDGE-5 API may be used for EAS discovery or EAS availability checking and may include FQDNs configured in the AC 205. That is, the AC 205 may send FQDNs configured in the AC 205 to the EEC 210 over the EDGE-5 API. In some cases, whenever the list of FQDNs is refreshed in the AC 205, the AC 205 may invoke the EDGE-5 API to check which FQDNs are available for edge computing.

Once the EEC 210 receives the list of FQDNs corresponding to services provided by the AC 205 for which the EEC 210 is to identify EASs, the EEC 210 may communicate (e.g., via wireless communications system 100) with the EES 215 over an EDGE-1 API to perform an EAS discovery procedure. The EDGE-1 API may include FQDNs provided by the AC 205. That is, the EEC 210 may forward the FQDNs provided by the AC 205 to the EES 215 over the EDGE-1 API. The EES may then return an identifier (e.g., IP address) of an EAS corresponding to each FQDN in the list to the EEC 210 (e.g., if such an EAS is available). If the EEC 210 retrieves an identifier of an EAS for an FQDN, the EEC 210 may return the FQDN to the AC 205 with the identifier of the EAS. After receiving the identifier of the EAS, the AC 205 may avoid or skip a DNS procedure. In some cases, if an FQDN is provided by the AC 205 to the EEC 210, the EEC 210 may perform a DNS procedure for the FQDN and may respond to the AC with a resolved IP address corresponding to the FQDN.

In another aspect, the AC 205 may provide a list of FQDNs to the EEC 210 corresponding to services marked by the AC 205 as edge computing services for the EEC 210 to use to identify EASs for the AC 205. For instance, the AC 205 may check availability for EDGEAPP with the marked services by invoking the EDGE-5 API. In this aspect, the EDGE-5 API may be used for EAS discovery or EAS availability checking and may include an AC profile with a type of the AC 205, one or more EAS IDs and key performance indicators (KPIs), and the list of FQDNs. The AC 205 may send the specific AC profile to the EEC 210 over the EDGE-5 API. The EEC 210 may then perform an EAS discovery procedure and may return corresponding EAS profiles to the AC 205 (e.g., including each FQDN with a corresponding identifier for an EAS for the FQDN).

In yet another aspect, the AC 205 may provide a profile of the AC 205 to the EEC 210 for the EEC 210 to use to identify EASs for the AC 205. The EEC 210 may use the profile of the AC 205 to identify any available EASs that may support services provided by the AC 205. That is, the AC 205 may check for any available service for EDGEAPP via EDGE-5. In this aspect, the EDGE-5 API may be used for EAS discovery or EAS availability checking and may include an AC profile with a type of the AC 205, an EAS ID for potentially suitable EASs for the AC 205, and an indication of KPIs. The EEC 210 may then perform an EAS discovery procedure and may return corresponding EAS profiles to the AC 205. For instance, the EEC 210 may return an EAS profile corresponding to the AC type or EAS ID and KPIs indicated by the AC 205. The AC 205 may then identify an EAS corresponding to an FQDN associated with each service of the AC 205 from the EAS profiles returned by the EEC (if any).

In yet another aspect, the EEC 210 may be an example of a DNS client (e.g., may play a role of a DNS client). In this aspect, the EEC 210 may perform EAS discovery to identify an EAS IP address for the AC 205 or for a specific service provided by the AC 205. If an EAS is not available for the service or for the AC 205, the EEC 210 may perform a DNS procedure to identify an AS (e.g., another server) for the AC 205. Thus, the EEC 210 may be able to play a role of a DNS client.

In the examples described above, the communication between the AC 205 and the EEC 210 may allow the EEC to identify suitable EASs for the AC 205 in an EAS discovery procedure.

Some AC operations may be added to the EDGE-5 API to facilitate edge service availability checking. The AC 205 may invoke the EDGE-5 API to check the availability of EASs for a specific service (e.g., identified by an FQDN) or any service for EDGEAPP. Whenever a list of FQDNs is refreshed in the AC 205, the AC 205 may invoke the EDGE-5 API to check the availability of EASs for the refreshed list of FQDNs. The AC 205 may check an EAS profile received from the EEC 210 to determine which services are available for edge computing and may show the available edge computing services to a user. If the EEC 210 returns an EAS IP address together with an FQDN, the AC 205 may use the EAS IP address as a DNS resolution.

Some EEC operations may also be added to the EDGE-5 API for responses from the EEC 210 to the AC 205 and to the corresponding EDGE-1 API for EAS discovery. If an FQDN is provided by the AC 205 to the EEC 210, and if an EAS IP address is not available in a response of an EAS discovery procedure (e.g., from the EES 215), the EEC 210 may perform a DNS procedure for the FQDN (e.g., available FQDN) and may respond to the AC 205 with the resolved IP address together with the FQDN. After the EEC receives a response for an EAS discovery procedure from the EES 215, the EEC 210 may identify which FQDN received from the EES 215 matches with the FQDN requested by the AC 205, and the EEC 210 may return the matched FQDN and EAS to the AC 205. In some cases, the EEC 210 may store the requested FQDN from the AC 205 and may check whether an EAS corresponding to the FQDN is available when the UE 115-a moves to a new location (e.g., updated tracking area, or new location determined based on Global Positioning System (GPS) or other location information) or when the EEC 210 receives an update of available EASs from the EES 215. The EEC 210 may then notify the AC 205 with an updated match of an EAS for an FQDN.

Figure 3:
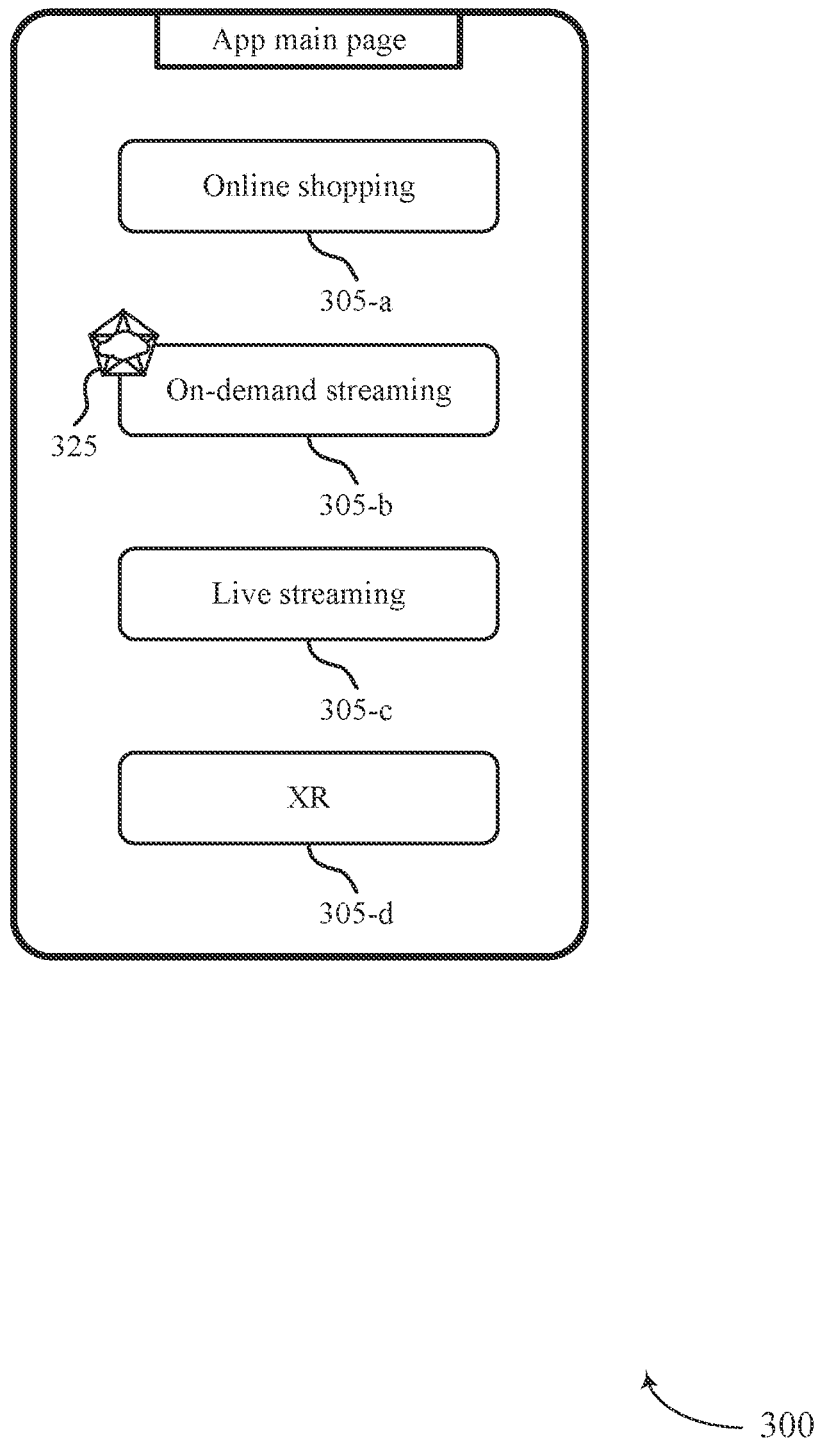
FIG. 3 illustrates an example of an application client running on a user equipment (UE) that supports server availability checking for edge computing services in accordance with aspects of the present disclosure.

FIG. 3 illustrates an example of an AC 300 running on a UE that supports server availability checking for edge computing services in accordance with aspects of the present disclosure. The AC 300 may provide multiple services including a first service 305-a for online shopping, a second service 305-b for on-demand streaming, a third service 305-c for live streaming, and a fourth service 305-d for extended reality (XR). As described with reference to FIG. 2, the AC 300 may communicate with an EEC to identify EASs for the services that may utilize edge computing. The AC 300 and the EEC may support one or more techniques for identifying EASs for one or more services.

In one aspect, the AC 300 may not be able to determine which services 305 may exploit EDGEAPP services (e.g., may utilize edge computing), and when a service is selected by the AC 300 or by a user, the AC 300 may perform a DNS procedure with an FQDN of the selected service. The list of FQDNs for the services of the AC 300 may be provided during initial page loading of the AC 300. In this aspect, the EEC may play a role of a DNS client and may perform EAS discovery to identify an EAS (e.g., EAS IP address) for the FQDN. If the EAS is unavailable, the EEC may perform a DNS procedure. The EEC may then return an identifier of the EAS or an AS to the AC 300 as part of the DNS procedure.

In another aspect, the AC 300 may not be able to determine which services 305 may exploit EDGEAPP services (e.g., may utilize edge computing), and the AC 300 may invoke an EDGE-5 API to check which FQDN is available with EDGEAPP. The list of FQDNs for the services of the AC 300 may be provided during initial page loading of the AC 300. The AC 300 may send the list of FQDNs to the EEC, and the EEC may perform EAS discovery to identify (or attempt to identify) an EAS for each FQDN in the list. Whenever the list of FQDNs is refreshed in the AC 300, the AC 300 may invoke the EDGE-5 API to check the availability of an EAS for each FQDN in the refreshed list. The EEC may provide one or more identifiers of EASs (e.g., EAS IP addresses) to the AC 300 based on the EAS discovery procedure (e.g., during an availability check). After receiving the identifiers of the EASs, the AC 300 may use these identifiers as a DNS resolution and may skip a DNS procedure.

In yet another aspect, an association for EDGEAPP for certain services may be configured for the AC 300. That is, the AC 300 may include an association for services capable of supporting edge computing. As an example, the second service 305-b, the third service 305-c, and the fourth service 305-d may be as associated with edge computing services. In this aspect, the AC 300 may check the availability for EDGEAPP with the corresponding services by invoking the EDGE-5 API (e.g., including sending an AC profile to the EEC). The EEC may respond to the AC 300 with EAS profiles (e.g., a list of EASs, services, KPIs, etc.), and the AC 300 may determine that the services matched to EASs received from the EEC are available for edge computing (e.g., a received EAS is available in an edge hosting environment). If a service is available for edge computing (e.g., available in an edge site), the AC 300 may use an FQDN or an IP address of an EAS provided by the EEC for the service (e.g., based on an EAS profile provided for the service).

In yet another aspect, the AC 300 may not be able to determine which services 305 are applicable for EDGEAPP, and the AC 300 may check any available service for EDGE-APP via the EDGE-5 API (e.g., based on an AC profile, an AC ID, an AC type, or KPIs). The EEC may respond to the AC 300 with EAS profiles that match with the AC profile (e.g., a list of EASs, services, KPIs, etc.), and the AC 300 may determine that the services for which EASs are received are available for edge computing (e.g., a received EAS profile is available in an edge site). In some cases, the AC 300 may determine to show edge-available services on an application page. As an example, if the AC 300 receives identifiers for EASs available for the second service 305-b, the third service 305-c, and the fourth service 305-d, the AC 300 may display these services as edge computing services (e.g., using an icon 325 or other identifier such as an outline color or fill pattern or color). If a service is available for edge computing (e.g., available in an edge site), the AC 300 may use an FQDN or an IP address of an EAS provided by the EEC for the service (e.g., based on an EAS profile provided for the service).

Figure 4:
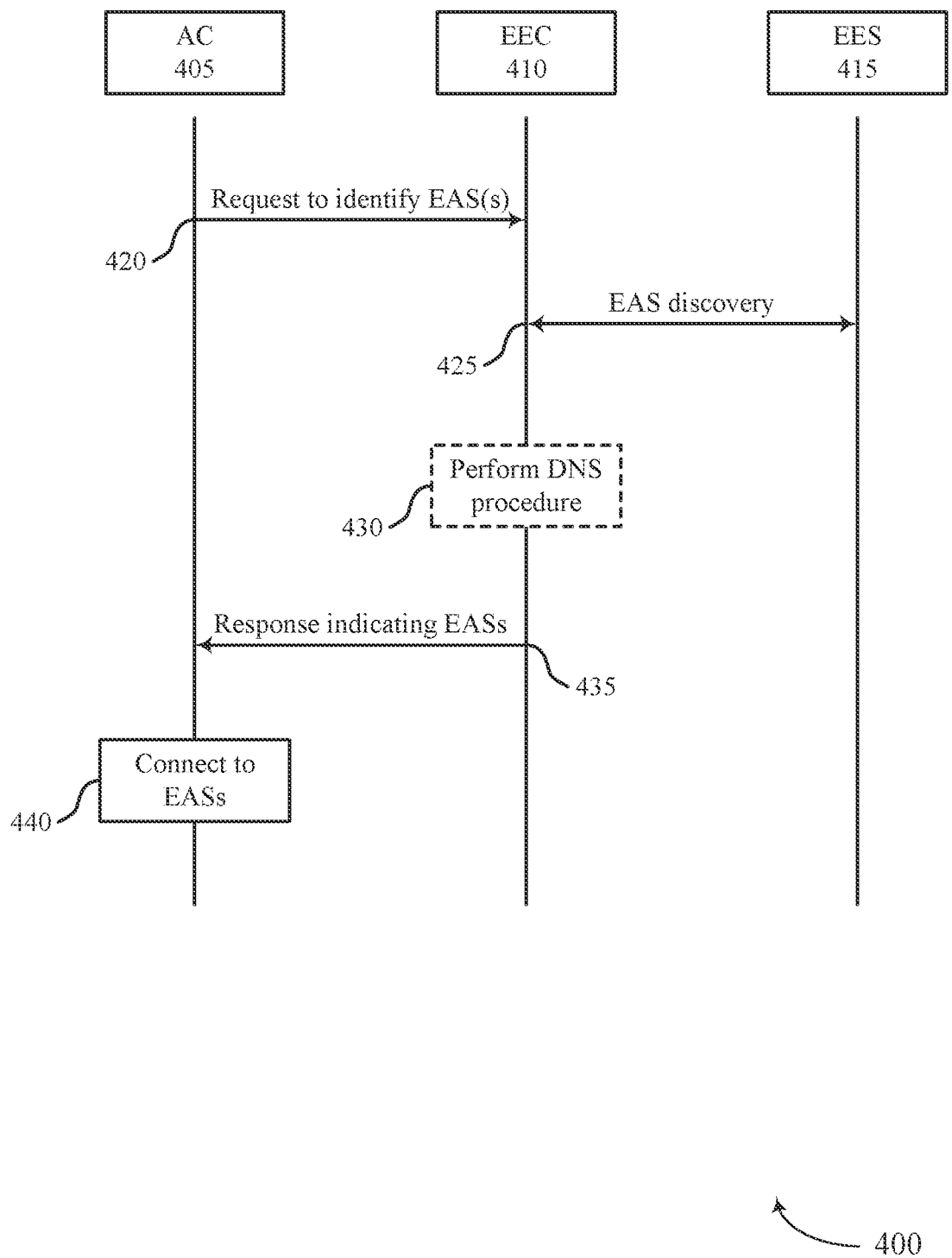
FIG. 4 illustrates an example of a process flow that supports server availability checking for edge computing services in accordance with aspects of the present disclosure.

FIG. 4 illustrates an example of a process flow 400 that supports server availability checking for edge computing services in accordance with aspects of the present disclosure. Process flow 400 includes an AC 405 and an EEC 410 of a UE 115, and process flow 400 includes an EES 415 of a network. The process flow 400 may implement aspects of the wireless communications system 100 or the wireless communications system 200. For example, the process flow 400 may support efficient techniques for identifying EASs for one or more services provided by the AC 405 to allow these services to utilize edge computing.

In the following description of the process flow 400, the signaling exchanged between the AC 405, EEC 410, and EES 415 may be exchanged in a different order than the example order shown, or the operations performed by the AC 405, EEC 410, and EES 415 may be performed in different orders or at different times. Some operations may also be omitted from the process flow 400, and other operations may be added to the process flow 400.

At 420, the AC 405 may send, and the EEC 410 may receive, a request to identify one or more EASs for one or more services of the AC 405. In some cases, the AC 405 may send, in the request, a list of domain names for which the EEC 410 is to identify the one or more EASs. In some examples, the AC 405 may identify the list of domain names to include in the request based on one or more services in the AC 405 marked as edge computing services. In such examples, the AC 405 may display the one or more services corresponding to the list of domain names included in the request as edge computing services. In other cases, the AC 405 may send, in the request, a profile of the AC 405 which the EEC 410 may use to identify the one or more EASs.

At 425, the EEC 410 may perform a discovery procedure to identify one or more EAS servers based on receiving the request at 420. The EEC 410 may communicate with the EES 415 to perform the EAS discovery procedure, and the EEC 410 may receive identifiers associated with a set of EASs from the EES 415. In some cases, the EEC 410 may perform the discovery procedure using a list of domains, a profile of the AC 405, or some other information received in the request from the AC 405 at 420. As an example, the EEC may transmit information about the AC 405 (e.g., an indication of a profile of the AC 405, a list or domain names, etc.) to the EES 415, and the EES may return identifiers of EASs (e.g., IP addresses) to the EEC 410 based on the information about the AC 405.

At 435, the EEC 410 may send a response to the request to the AC 405 based on performing the EAS discovery procedure at 425. In some cases (e.g., if the EEC 410 receives a list of domain names from the AC 405 for which to identify one or more EASs), the EEC 410 may match each domain name of at least a subset of the list of domain names to a respective EAS in a set of EASs received from the EES 415 based on performing the discovery procedure at 425. The EEC 410 may then send, in the response to the AC 405, an indication of the respective EAS matched to each domain name. In other cases (e.g., if the EEC 410 receives a profile of the AC 405 to use to identify one or more EASs), the EEC 410 may send, in the response to the AC 405, an indication of the set of EASs received from the EES 415 (e.g., without performing matching). In such cases, the AC 405 may match each service of a subset of the one or more services to a respective EAS in the set of EASs. In some examples, the AC 405 may display the subset of the one or more services matched to EASs in the set of EASs as edge computing services.

In some cases, at 430, the EEC 410 may determine that the EAS discovery procedure at 425 failed to return an EAS for at least one of the one or more services of the AC 405. In such cases, the EEC 410 may perform a DNS procedure to identify another server for the at least one of the one or more services of the AC 405 based on the determining. The EEC 410 may then send, in the response at 435, an identifier (e.g., an IP address) of the other server based on performing the DNS procedure. The AC 405 may use the response from the EEC 410 including identifiers of one or more EASs or identifiers of other servers as a DNS procedure resolution. Thus, the AC 405 may avoid performing a DNS procedure after receiving the response. In such cases, the EEC 410 may play a role of a DNS client and may perform a DNS procedure to identify an EAS IP address or AS IP address if the result of the EAS discovery procedure does not include (e.g., fails to include) an EAS IP address for a requested FQDN. The EEC 410 may then return the EAS IP address or AS IP address for the requested FQDN to the AC 405.

Once the AC 405 receives the identifiers of EASs or other servers from the EEC 410, at 440, the AC 405 may connect to the EASs to support edge computing for corresponding services, or the AC may connect to the other servers to support the corresponding services (e.g., without edge computing). In some cases, the EEC 410 may store the list of domain names for which the EEC 410 is to identify the one or more EA Ss. and the EEC 410 may perform another discovery procedure using the list of domain names based on a change in location of the UE 115, an update to availability of the one or more EASs for the one or more services of the AC 405, or a combination thereof. In some cases, the AC 405 may determine that the list of domain names for which the EEC 410 is to identify the one or more EASs is refreshed in the AC 405, and the EEC 410 may send another request including the refreshed list of domain names for which the EEC 410 is to identify the one or more EASs.

In the examples described above, the AC 405 may provide the EEC 410 with a list of FQDNs for which the EEC 410 is to check the availability of edge computing services. The EEC 410 may perform an EAS discovery procedure using (e.g., including) the list of FQDNs. After the EEC 410 receives a response from the EES 415, the EEC may identify which FQDN received from the EES 415 matches with an FQDN requested by the AC 405, and the EEC 410 may return the matched FQDN or an identifier of an EAS corresponding to the matched FQDN to the AC 405. The AC 405 may then determine that a service corresponding to the matched FQDN is available for edge computing. If an EAS IP address is available at the EEC 410 (e.g., either received from the EES 415 or identified in a DNS procedure performed by the EEC 410), the EEC 410 may return an EAS IP address together with the FQDN to the AC 405 and the AC 405 may skip a DNS procedure.

In some cases, the AC 405 may include a full list of FQDNs (e.g., corresponding to all services of the AC 405) in the request sent to the EEC 410 at 420 (e.g., if the AC 405 is unable to determine whether each service identified by an FQDN is an edge computing service). In other cases, the AC 405 may include a specific list of FQDNs (e.g., corresponding to a subset of services of the AC 405) in the request sent to the EEC 410 at 420 (e.g., if the AC 405 is able to determine whether each service identified by an FQDN is an edge computing service). Alternatively, if the AC 405 does not include (e.g., fails to include) any FQDNs in the request sent to the EEC 410 at 420, then the EEC 410 may provide the AC 405 with any available EAS profiles received or returned in the EAS discovery procedure performed at 425. The AC 405 may then check the EAS profiles received from the EEC 410 to determine which services are available for edge computing.

Figure 5:
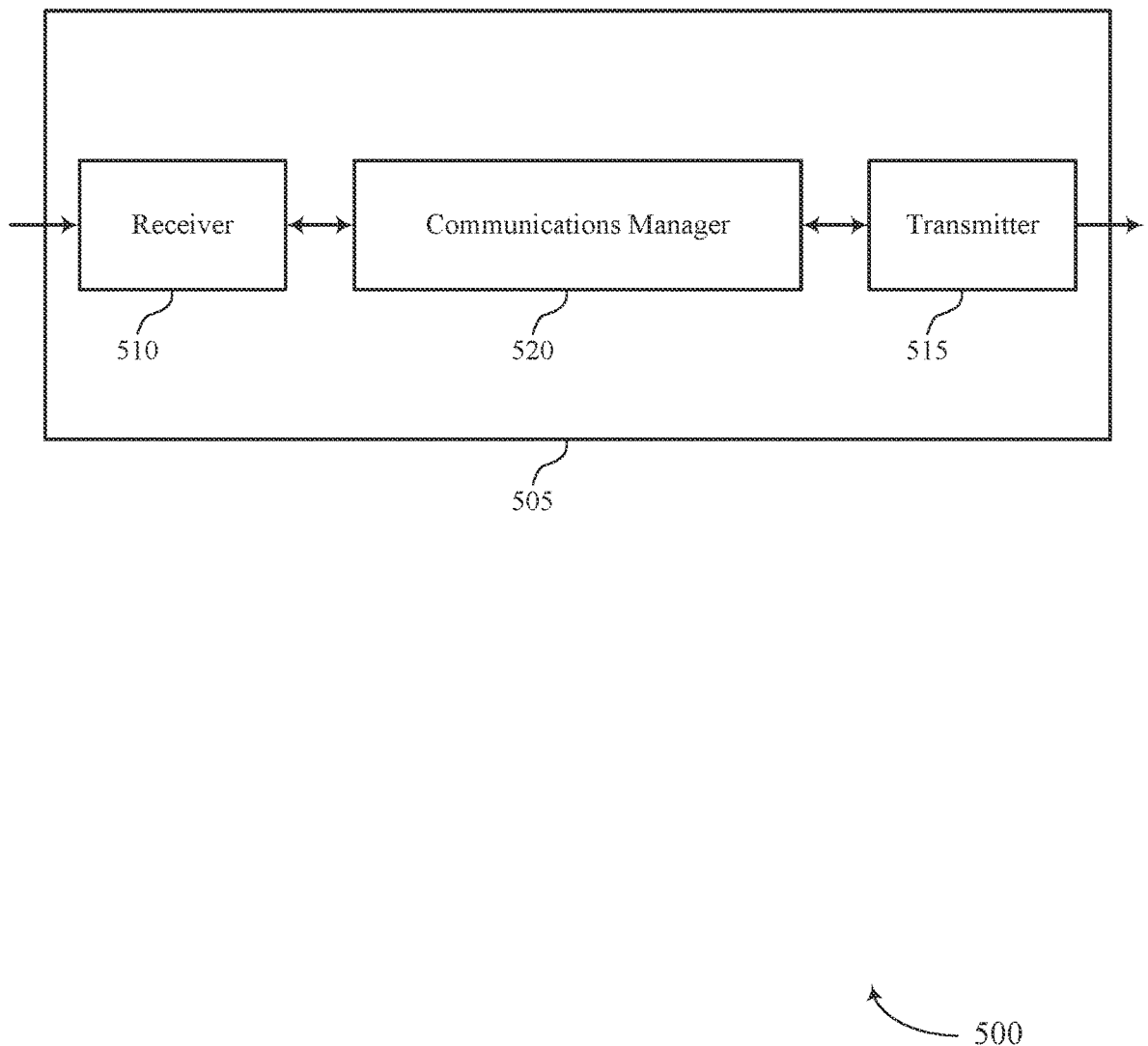
FIGS. 5 and 6 show block diagrams of devices that support server availability checking for edge computing services in accordance with aspects of the present disclosure.

FIG. 5 shows a block diagram 500 of a device 505 that supports server availability checking for edge computing services in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to server availability checking for edge computing services). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to server availability checking for edge computing services). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of server availability checking for edge computing services as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from an application client of the UE at an edge enabler client of the UE, a request to identify one or more edge application servers for one or more services of the application client. The communications manager 520 may be configured as or otherwise support a means for performing, at the edge enabler client, a discovery procedure to identify the one or more edge application servers based on receiving the request. The communications manager 520 may be configured as or otherwise support a means for sending, to the application client from the edge enabler client, a response to the request based on performing the discovery procedure.

Additionally, or alternatively, the communications manager 520 may support wireless communication at a UE in accordance with examples as disclosed herein. For example, the communications manager 520 may be configured as or otherwise support a means for sending, from an application client of the UE to an edge enabler client of the UE, a request to identify one or more edge application servers for one or more services of the application client. The communications manager 520 may be configured as or otherwise support a means for receiving, at the application client from the edge enabler client, a response to the request including at least one of the one or more edge application servers. The communications manager 520 may be configured as or otherwise support a means for connecting to the at least one edge application server based on receiving the response.

Additionally, or alternatively, the communications manager 520 may support wireless communication at a UE in accordance with examples as disclosed herein. For example, the communications manager 520 may be configured as or otherwise support a means for receiving, from an application client of the UE at an edge enabler client of the UE, a request to perform a domain name system procedure using a domain name associated with a service of the application client, where the edge enabler client operates as a domain name system client. The communications manager 520 may be configured as or otherwise support a means for performing, at the edge enabler client, a discovery procedure to identify an edge application server for the service of the application client based on receiving the request. The communications manager 520 may be configured as or otherwise support a means for sending, to the application client from the edge enabler client, a response to the request indicating an internet protocol address of the edge application server for the service of the application client or an internet protocol address of another server for the service of the application client.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources. Because a UE may be able to identify suitable EASs for services of an AC capable of supporting edge computing, the AC may utilize edge computing for these services. Accordingly, the AC may offload processing to these EASs and achieve reduced processing and reduced power consumption. Further, the AC may quickly access data stored on these EASs and may experience lower latency for wireless communications and thus achieve more efficient utilization of communication resources.

Figure 6:
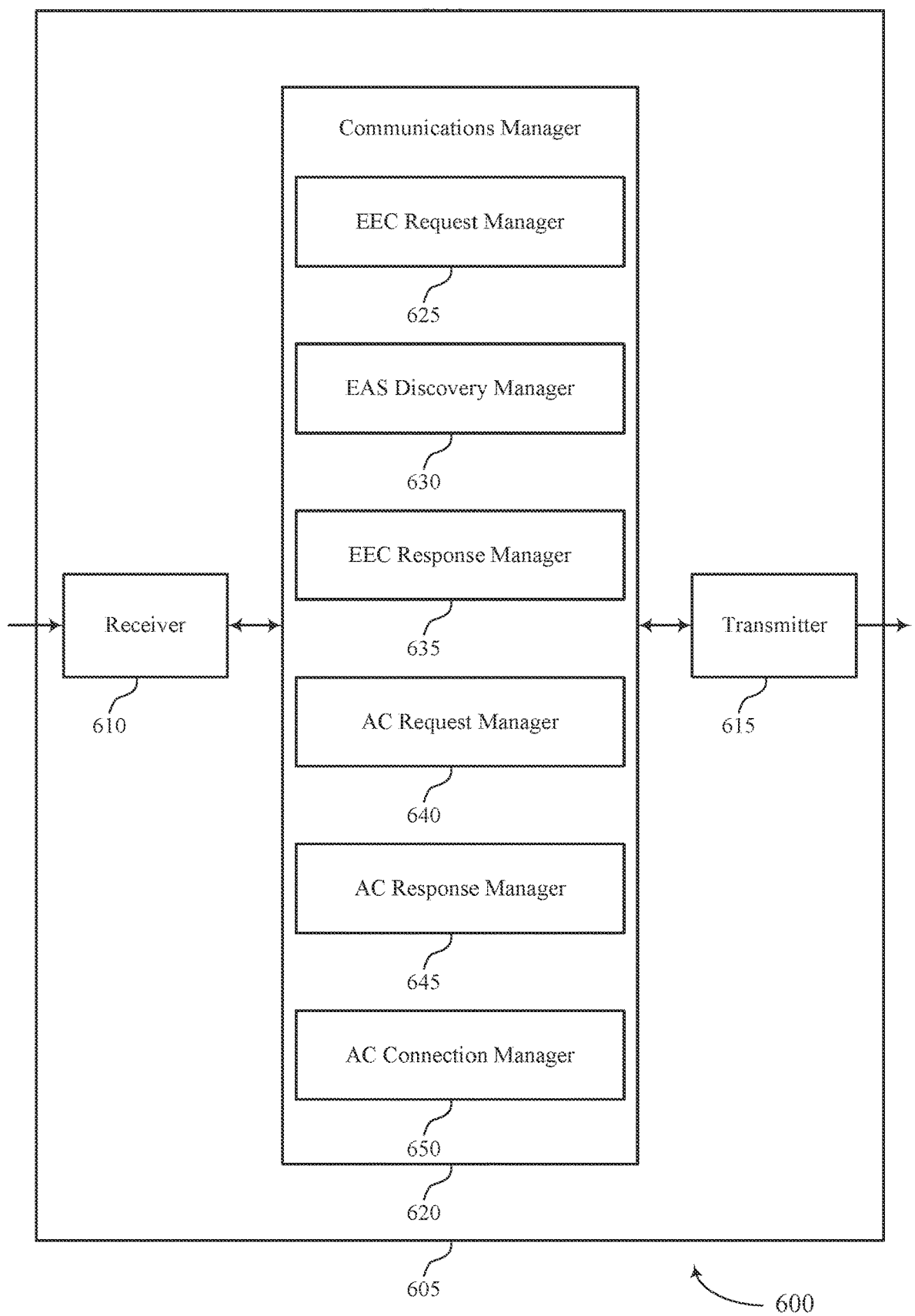

FIG. 6 shows a block diagram 600 of a device 605 that supports server availability checking for edge computing services in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to server availability checking for edge computing services). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to server availability checking for edge computing services). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of server availability checking for edge computing services as described herein. For example, the communications manager 620 may include a EEC request manager 625, a EAS discovery manager 630, a EEC response manager 635, an AC request manager 640, an AC response manager 645, an AC connection manager 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The EEC request manager 625 may be configured as or otherwise support a means for receiving, from an application client of the UE at an edge enabler client of the UE, a request to identify one or more edge application servers for one or more services of the application client. The EAS discovery manager 630 may be configured as or otherwise support a means for performing, at the edge enabler client, a discovery procedure to identify the one or more edge application servers based on receiving the request. The EEC response manager 635 may be configured as or otherwise support a means for sending, to the application client from the edge enabler client, a response to the request based on performing the discovery procedure.

Additionally, or alternatively, the communications manager 620 may support wireless communication at a UE in accordance with examples as disclosed herein. The AC request manager 640 may be configured as or otherwise support a means for sending, from an application client of the UE to an edge enabler client of the UE, a request to identify one or more edge application servers for one or more services of the application client. The AC response manager 645 may be configured as or otherwise support a means for receiving, at the application client from the edge enabler client, a response to the request including at least one of the one or more edge application servers. The AC connection manager 650 may be configured as or otherwise support a means for connecting to the at least one edge application server based on receiving the response.

Additionally, or alternatively, the communications manager 620 may support wireless communication at a UE in accordance with examples as disclosed herein. The EEC request manager 625 may be configured as or otherwise support a means for receiving, from an application client of the UE at an edge enabler client of the UE, a request to perform a domain name system procedure using a domain name associated with a service of the application client, where the edge enabler client operates as a domain name system client. The EAS discovery manager 630 may be configured as or otherwise support a means for performing, at the edge enabler client, a discovery procedure to identify an edge application server for the service of the application client based on receiving the request. The EEC response manager 635 may be configured as or otherwise support a means for sending, to the application client from the edge enabler client, a response to the request indicating an internet protocol address of the edge application server for the service of the application client or an internet protocol address of another server for the service of the application client.

Figure 7:
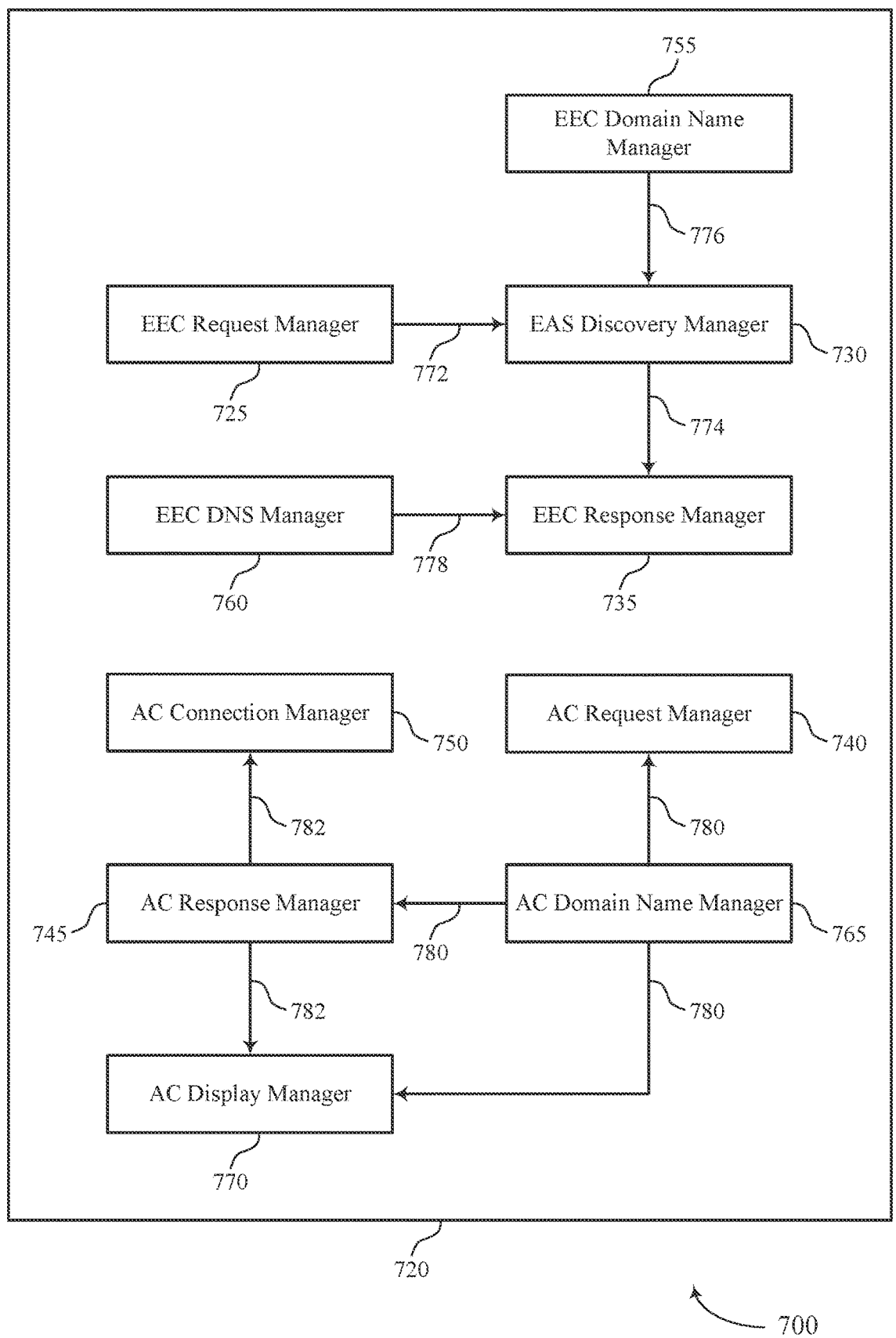
FIG. 7 shows a block diagram of a communications manager that supports server availability checking for edge computing services in accordance with aspects of the present disclosure.

FIG. 7 shows a block diagram 700 of a communications manager 720 that supports server availability checking for edge computing services in accordance with aspects of the present disclosure. The communications manager 720 may be an example of aspects of a communications manager 520, a communications manager 620, or both, as described herein. The communications manager 720, or various components thereof, may be an example of means for performing various aspects of server availability checking for edge computing services as described herein. For example, the communications manager 720 may include an EEC request manager 725, an EAS discovery manager 730, an EEC response manager 735, an AC request manager 740, an AC response manager 745, an AC connection manager 750, an EEC domain name manager 755, an EEC DNS manager 760, an AC domain name manager 765, an AC display manager 770, or any combination thereof. Each of these components may communicate, directly or indirectly, with one another (e.g., via one or more buses).

The communications manager 720 may support wireless communication at a UE in accordance with examples as disclosed herein. The EEC request manager 725 may be configured as or otherwise support a means for receiving, from an application client of the UE at an edge enabler client of the UE, a request to identify one or more edge application servers for one or more services of the application client. The EEC request manager 725 may pass the request 772 to the EAS discovery manager 730, and the EAS discovery manager 730 may be configured as or otherwise support a means for performing, at the edge enabler client, a discovery procedure to identify the one or more edge application servers based on receiving the request. The EAS discovery manager 730 may then pass at least one edge application server 774 identified in the discovery procedure to the EEC response manager 735, and the EEC response manager 735 may be configured as or otherwise support a means for sending, to the application client from the edge enabler client, a response to the request based on the EAS discovery manager 730 performing the discovery procedure.

In some examples, to support receiving the request to identify the one or more edge application servers, the EEC domain name manager 755 may be configured as or otherwise support a means for receiving a list of domain names for which to identify the one or more edge application servers, and the EAS discovery manager 730 may perform the discovery procedure using the list of domain names. In some examples, the EEC domain name manager 755 may pass the list of domain names 776 to the EAS discovery manager 730.

In some examples, the EAS discovery manager 730 may be configured as or otherwise support a means for receiving, at the edge enabler client from an edge enabler server, identifiers associated with a set of edge application servers based on performing the discovery procedure. In some examples, the EAS discovery manager 730 may be configured as or otherwise support a means for matching each domain name of at least a subset of the list of domain names to a respective edge application server in the set of edge application servers. In some examples, the EEC response manager 735 may be configured as or otherwise support a means for sending, in the response to the application client, an indication of the respective edge application server matched to each domain name. In some examples, the EAS discovery manager 730 may pass the respective edge application server 774 matched to each domain name to the EEC response manager 735.

In some examples, the EEC domain name manager 755 may be configured as or otherwise support a means for storing the list of domain names for which the edge enabler client is to identify the one or more edge application servers. In some examples, the EAS discovery manager 730 may be configured as or otherwise support a means for performing another discovery procedure using the list of domain names based on a change in location of the UE, an update to availability of the one or more edge application servers for the one or more services of the application client, or a combination thereof.

In some examples, to support performing the discovery procedure, the EAS discovery manager 730 may be configured as or otherwise support a means for identifying, at the edge enabler client, a profile of the application client in the request from the application client. In some examples, to support performing the discovery procedure, the EAS discovery manager 730 may be configured as or otherwise support a means for performing the discovery procedure to identify the one or more edge application servers based on the identifying.

In some examples, the EAS discovery manager 730 may be configured as or otherwise support a means for receiving, at the edge enabler client from an edge enabler server, identifiers associated with a set of edge application servers based on performing the discovery procedure. In some examples, the EEC response manager 735 may be configured as or otherwise support a means for sending, in the response to the application client, an indication of the set of edge application servers received from the edge enabler server. In some examples, the EAS discovery manager 730 may pass the set of edge application servers 774 received from the edge enabler server to the EEC response manager 735.

In some examples, the EEC DNS manager 760 may be configured as or otherwise support a means for determining that the discovery procedure failed to return an edge application server for at least one of the one or more services of the application client. In some examples, the EEC DNS manager 760 may be configured as or otherwise support a means for performing, at the edge enabler client, a domain name system procedure to identify another server for the at least one of the one or more services of the application client based on the determining. In some examples, the EEC response manager 735 may be configured as or otherwise support a means for sending, in the response to the request, an identifier of the other server based on performing the domain name system procedure. In some examples, the EEC DNS manager 760 may pass the other server 778 to the EEC response manager 735.

Additionally, or alternatively, the communications manager 720 may support wireless communication at a UE in accordance with examples as disclosed herein. The AC request manager 740 may be configured as or otherwise support a means for sending, from an application client of the UE to an edge enabler client of the UE, a request to identify one or more edge application servers for one or more services of the application client. The AC response manager 745 may be configured as or otherwise support a means for receiving, at the application client from the edge enabler client, a response to the request including at least one of the one or more edge application servers. The AC connection manager 750 may be configured as or otherwise support a means for connecting to the at least one edge application server based on the AC response manager 745 receiving the response.

In some examples, the AC domain name manager 765 may be configured as or otherwise support a means for sending, in the request, a list of domain names for which the edge enabler client is to identify the one or more edge application servers. In some examples, the AC response manager 745 may be configured as or otherwise support a means for receiving, in the response, an indication of a respective edge application server matched to each domain name of at least a subset of the list of domain names. In some examples, the AC domain name manager 765 may pass the list of domain names 780 to the AC response manager 745.

In some examples, the AC domain name manager 765 may be configured as or otherwise support a means for identifying the list of domain names to include in the request based on one or more services in the application client marked as edge computing services. In some examples, the AC domain name manager 765 may pass the list of domain names 780 to the AC request manager 740. In some examples, the AC display manager 770 may be configured as or otherwise support a means for displaying, in the application client as edge computing services, the one or more services corresponding to the list of domain names included in the request. In some examples, the AC domain name manager 765 may pass the list of domain names 780 to the AC display manager 770.

In some examples, the AC domain name manager 765 may be configured as or otherwise support a means for determining that the list of domain names for which the edge enabler client is to identify the one or more edge application servers is refreshed in the application client. In some examples, the AC request manager 740 may be configured as or otherwise support a means for sending, from the application client to the edge enabler client, another request including the refreshed list of domain names for which the edge enabler client is to identify the one or more edge application servers based on the determining. In some examples, the AC domain name manager 765 may pass the refreshed list of domain names 780 to the AC request manager 740.

In some examples, the AC request manager 740 may be configured as or otherwise support a means for sending, in the request, an indication of a profile of the application client. In some examples, the AC response manager 745 may be configured as or otherwise support a means for receiving, in the response, identifiers associated with a set of edge application servers available for the application client based on sending the indication. In some examples, the AC connection manager 750 may be configured as or otherwise support a means for matching each service of a subset of the one or more services to a respective edge application server in the set of edge application servers. In some examples, the AC response manager 745 may pass the set of edge application servers 782 to the AC connection manager 750.

In some examples, the AC display manager 770 may be configured as or otherwise support a means for displaying, in the application client as edge computing services, the subset of the one or more services matched to edge application servers in the set of edge application servers. In some examples, the AC response manager 745 may pass the set of edge application servers 782 to the AC display manager 770.

Additionally, or alternatively, the communications manager 720 may support wireless communication at a UE in accordance with examples as disclosed herein. In some examples, the EEC request manager 725 may be configured as or otherwise support a means for receiving, from an application client of the UE at an edge enabler client of the UE, a request to perform a domain name system procedure using a domain name associated with a service of the application client, where the edge enabler client operates as a domain name system client. The EEC request manager 725 may pass the request 772 to the EAS discovery manager 730, and the EAS discovery manager 730 may be configured as or otherwise support a means for performing, at the edge enabler client, a discovery procedure to identify an edge application server for the service of the application client based on receiving the request. The EAS discovery manager 730 may then pass at least one edge application server 774 or another server identified in the discovery procedure to the EEC response manager 735, and the EEC response manager 735 may be configured as or otherwise support a means for sending, to the application client from the edge enabler client, a response to the request indicating an internet protocol address of the edge application server for the service of the application client or an internet protocol address of another server for the service of the application client.

In some examples, the EEC DNS manager 760 may be configured as or otherwise support a means for determining that the discovery procedure failed to return the edge application server for the service of the application client. In some examples, the EEC DNS manager 760 may be configured as or otherwise support a means for performing the domain name system procedure to identify the other server for the service of the application client based on the determining. In some examples, the EEC DNS manager 760 may be configured as or otherwise support a means for sending, in the response to the request, the internet protocol address of the other server for the service of the application client based on performing the domain name system procedure. In some examples, the EEC DNS manager 760 may pass the other server 778 to the EEC response manager 735.

In some examples, the application client uses the response from the edge enabler client including the internet protocol address of the edge application server or the internet protocol address of the other server as a domain name system procedure resolution.

Figure 8:
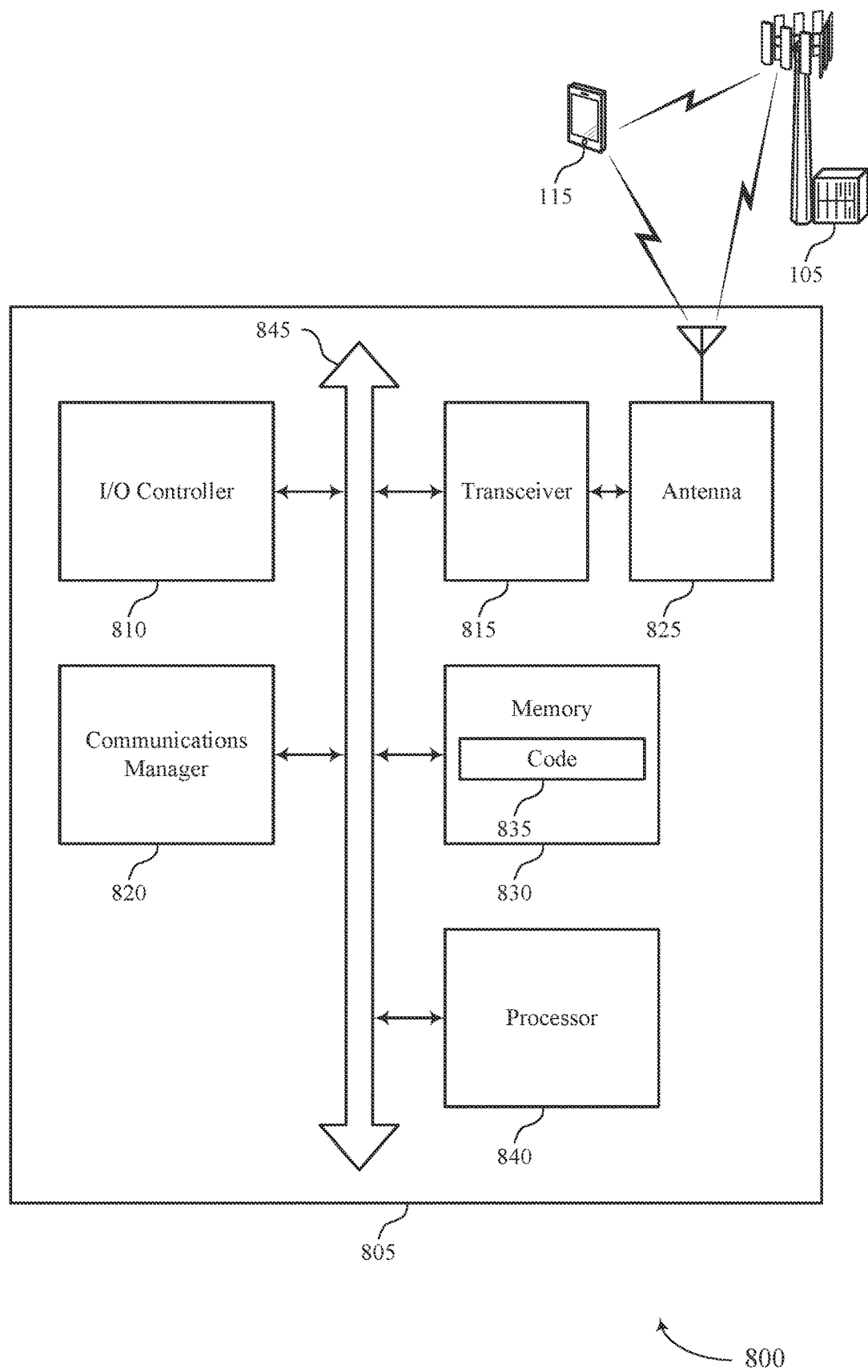
FIG. 8 shows a diagram of a system including a device that supports server availability checking for edge computing services in accordance with aspects of the present disclosure.

FIG. 8 shows a diagram of a system 800 including a device 805 that supports server availability checking for edge computing services in accordance with aspects of the present disclosure. The device 805 may be an example of or include the components of a device 505, a device 605, or a UE 15 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the U/O controller 810 may utilize an operating system such as iOS®, ANDROID®, MS-DOS®, MS-WINDOWS®, OS/2®, UNIX®, LINUX®, or another known operating system. Additionally. or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting server availability checking for edge computing services). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from an application client of the UE at an edge enabler client of the UE, a request to identify one or more edge application servers for one or more services of the application client. The communications manager 820 may be configured as or otherwise support a means for performing, at the edge enabler client, a discovery procedure to identify the one or more edge application servers based on receiving the request. The communications manager 820 may be configured as or otherwise support a means for sending, to the application client from the edge enabler client, a response to the request based on performing the discovery procedure.

Additionally, or alternatively, the communications manager 820 may support wireless communication at a UE in accordance with examples as disclosed herein. For example, the communications manager 820 may be configured as or otherwise support a means for sending, from an application client of the UE to an edge enabler client of the UE, a request to identify one or more edge application servers for one or more services of the application client. The communications manager 820 may be configured as or otherwise support a means for receiving, at the application client from the edge enabler client, a response to the request including at least one of the one or more edge application servers. The communications manager 820 may be configured as or otherwise support a means for connecting to the at least one edge application server based on receiving the response.

Additionally, or alternatively, the communications manager 820 may support wireless communication at a UE in accordance with examples as disclosed herein. For example, the communications manager 820 may be configured as or otherwise support a means for receiving, from an application client of the UE at an edge enabler client of the UE, a request to perform a domain name system procedure using a domain name associated with a service of the application client, where the edge enabler client operates as a domain name system client. The communications manager 820 may be configured as or otherwise support a means for performing, at the edge enabler client, a discovery procedure to identify an edge application server for the service of the application client based on receiving the request. The communications manager 820 may be configured as or otherwise support a means for sending, to the application client from the edge enabler client, a response to the request indicating an internet protocol address of the edge application server for the service of the application client or an internet protocol address of another server for the service of the application client.

By including or configuring the communications manager 820 in accordance with examples as described herein, the device 805 may support techniques for reduced processing, reduced power consumption, and more efficient utilization of communication resources. Because a UE may be able to identify suitable EASs for services of an AC capable of supporting edge computing, the AC may utilize edge computing for these services. Accordingly, the AC may offload processing to these EASs and achieve reduced processing and reduced power consumption. Further, the AC may quickly access data stored on these EASs and may experience lower latency for wireless communications and thus achieve more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of server availability checking for edge computing services as described herein, or the processor 840 and the memory 830 may be otherwise configured to perform or support such operations.

Figure 9:
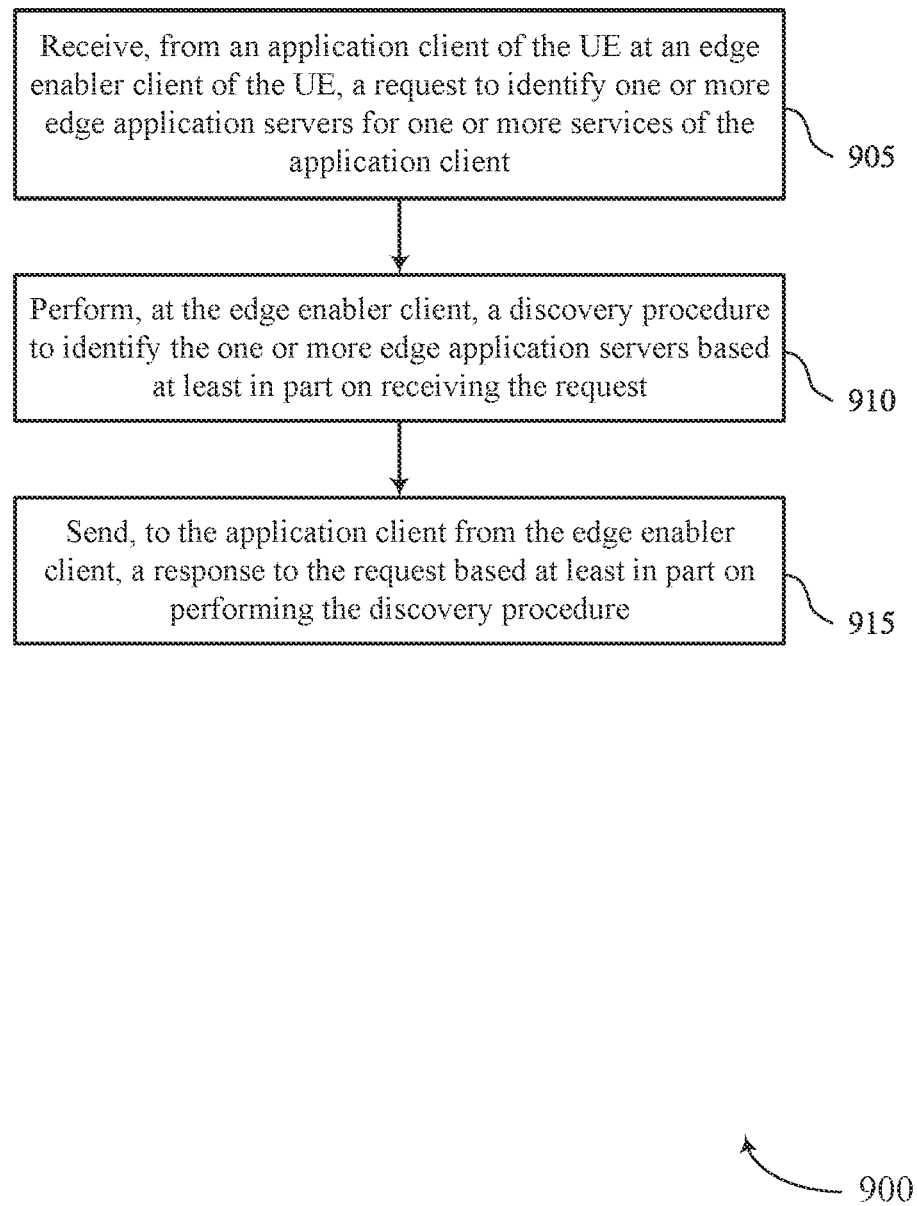
FIGS. 9 through 11 show flowcharts illustrating methods that support server availability checking for edge computing services in accordance with aspects of the present disclosure.

FIG. 9 shows a flowchart illustrating a method 900 that supports server availability checking for edge computing services in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, from an application client of the UE at an edge enabler client of the UE, a request to identify one or more edge application servers for one or more services of the application client. The operations of 905 may be performed in accordance with examples as disclosed herein. In some examples, aspects of the operations of 905 may be performed by a EEC request manager 725 as described with reference to FIG. 7.

At 910, the method may include performing, at the edge enabler client, a discovery procedure to identify the one or more edge application servers based on receiving the request. The operations of 910 may be performed in accordance with examples as disclosed herein. In some examples, aspects of the operations of 910 may be performed by a EAS discovery manager 730 as described with reference to FIG. 7.

At 915, the method may include sending, to the application client from the edge enabler client, a response to the request based on performing the discovery procedure. The operations of 915 may be performed in accordance with examples as disclosed herein. In some examples, aspects of the operations of 915 may be performed by a EEC response manager 735 as described with reference to FIG. 7.

Figure 10:
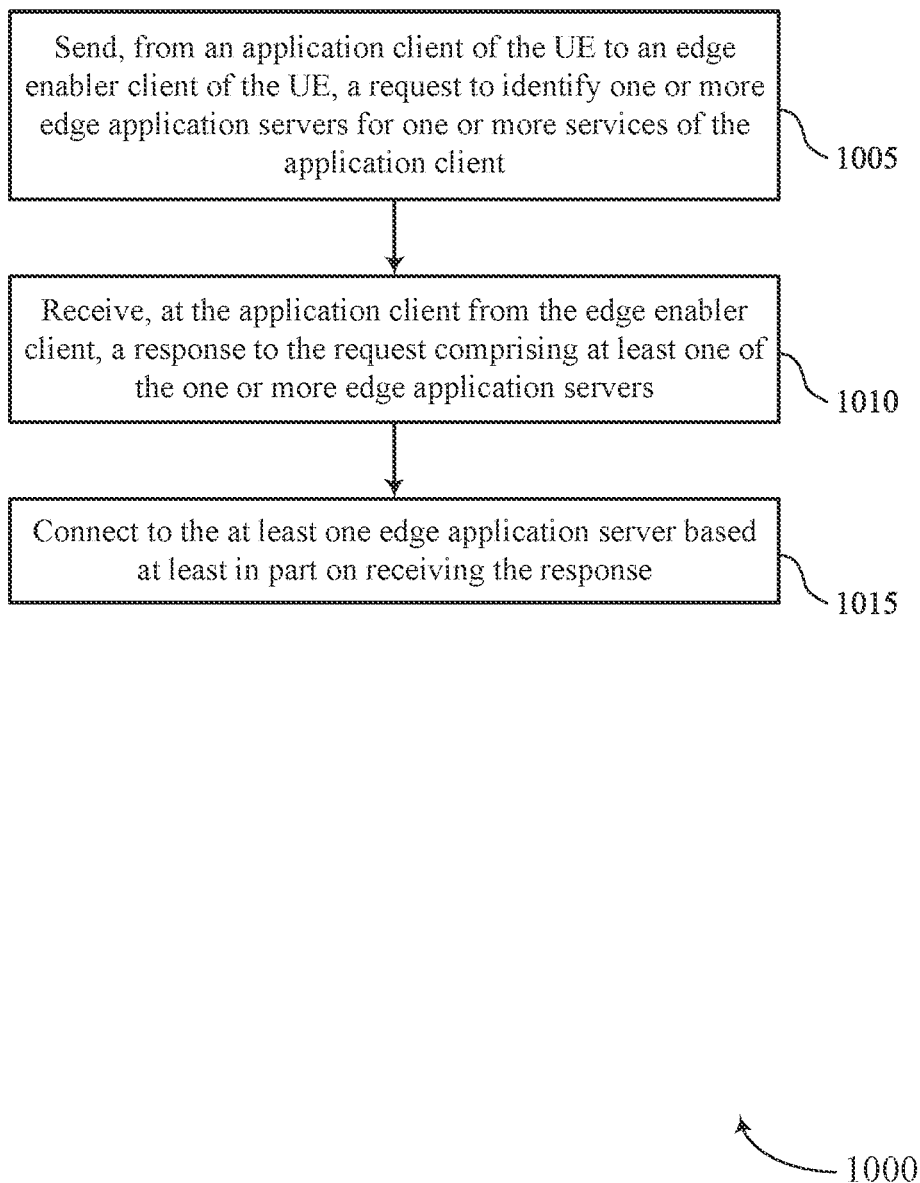

FIG. 10 shows a flowchart illustrating a method 1000 that supports server availability checking for edge computing services in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include sending, from an application client of the UE to an edge enabler client of the UE, a request to identify one or more edge application servers for one or more services of the application client. The operations of 1005 may be performed in accordance with examples as disclosed herein. In some examples, aspects of the operations of 1005 may be performed by an AC request manager 740 as described with reference to FIG. 7.

At 1010, the method may include receiving, at the application client from the edge enabler client, a response to the request including at least one of the one or more edge application servers. The operations of 1010 may be performed in accordance with examples as disclosed herein. In some examples, aspects of the operations of 1010 may be performed by an AC response manager 745 as described with reference to FIG. 7.

At 1015, the method may include connecting to the at least one edge application server based on receiving the response. The operations of 1015 may be performed in accordance with examples as disclosed herein. In some examples, aspects of the operations of 1015 may be performed by an AC connection manager 750 as described with reference to FIG. 7.

Figure 11:
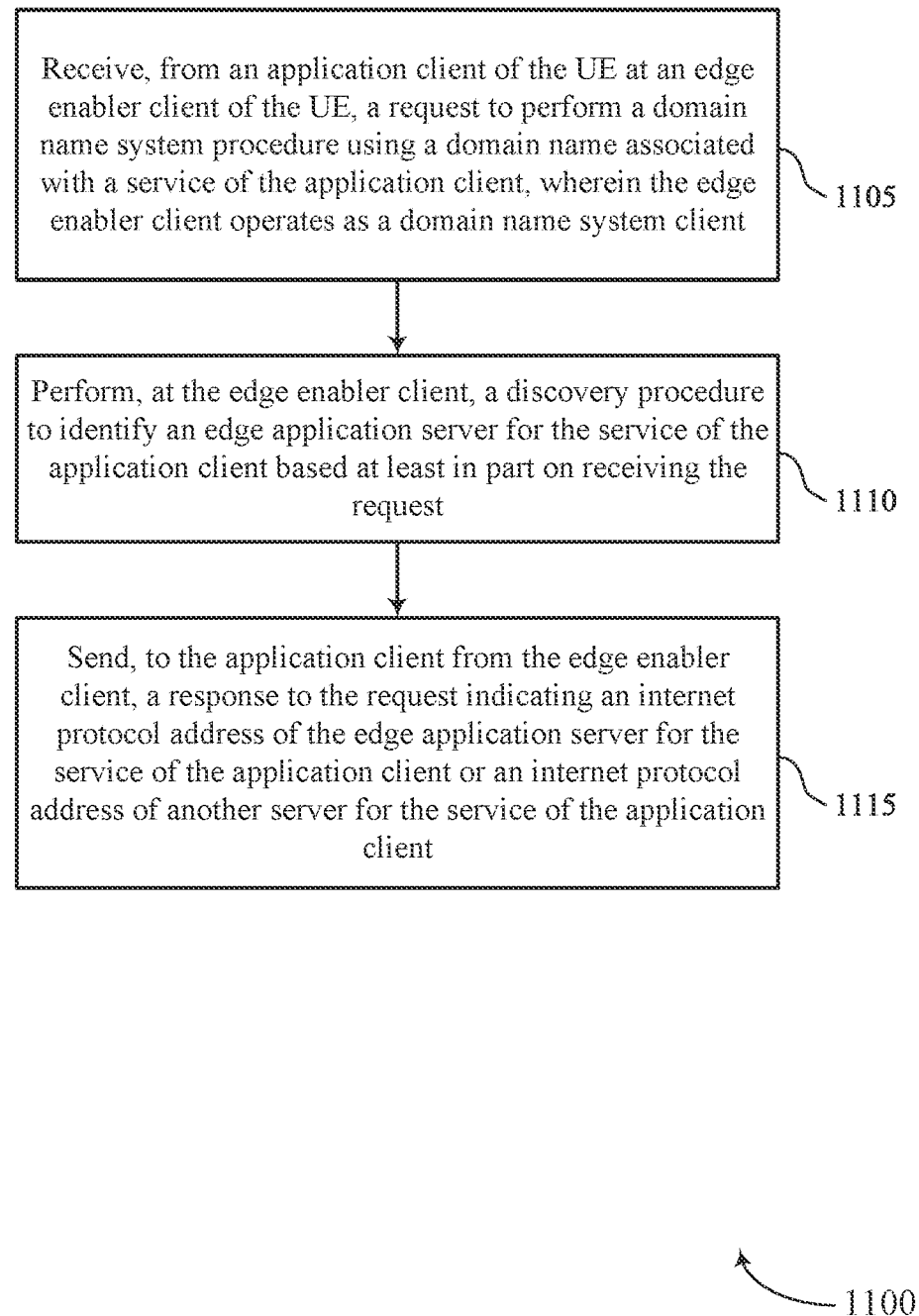

FIG. 11 shows a flowchart illustrating a method 1100 that supports server availability checking for edge computing services in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, from an application client of the UE at an edge enabler client of the UE, a request to perform a domain name system procedure using a domain name associated with a service of the application client, where the edge enabler client operates as a domain name system client. The operations of 1105 may be performed in accordance with examples as disclosed herein. In some examples, aspects of the operations of 1105 may be performed by a EEC request manager 725 as described with reference to FIG. 7.

At 1110, the method may include performing, at the edge enabler client, a discovery procedure to identify an edge application server for the service of the application client based on receiving the request. The operations of 1110 may be performed in accordance with examples as disclosed herein. In some examples, aspects of the operations of 1110 may be performed by a EAS discovery manager 730 as described with reference to FIG. 7.

At 1115, the method may include sending, to the application client from the edge enabler client, a response to the request indicating an internet protocol address of the edge application server for the service of the application client or an internet protocol address of another server for the service of the application client. The operations of 1115 may be performed in accordance with examples as disclosed herein. In some examples, aspects of the operations of 1115 may be performed by a EEC response manager 735 as described with reference to FIG. 7.

The following provides an overview of aspects of the present disclosure:

Aspect 1: A method for wireless communication at a UE, comprising: receiving, from an application client of the UE at an edge enabler client of the UE, a request to identify one or more edge application servers for one or more services of the application client; performing, at the edge enabler client, a discovery procedure to identify the one or more edge application servers based at least in part on receiving the request; and sending, to the application client from the edge enabler client, a response to the request based at least in part on performing the discovery procedure.

Aspect 2: The method of aspect 1, wherein receiving the request to identify the one or more edge application servers comprises: receiving a list of domain names for which to identify the one or more edge application servers, wherein performing the discovery procedure comprises: performing the discovery procedure using the list of domain names.

Aspect 3: The method of aspect 2, further comprising: receiving, at the edge enabler client from an edge enabler server, identifiers associated with a set of edge application servers based at least in part on performing the discovery procedure; matching each domain name of at least a subset of the list of domain names to a respective edge application server in the set of edge application servers; and sending, in the response to the application client, an indication of the respective edge application server matched to each domain name.

Aspect 4: The method of any of aspects 2 through 3, further comprising: storing the list of domain names for which the edge enabler client is to identify the one or more edge application servers, and performing another discovery procedure using the list of domain names based at least in part on a change in location of the UE, an update to availability of the one or more edge application servers for the one or more services of the application client, or a combination thereof.

Aspect 5: The method of any of aspects 1 through 4, wherein performing the discovery procedure comprises: identifying, at the edge enabler client, a profile of the application client in the request from the application client; and performing the discovery procedure to identify the one or more edge application servers based at least in part on the identifying.

Aspect 6: The method of aspect 5, further comprising: receiving, at the edge enabler client from an edge enabler server, identifiers associated with a set of edge application servers based at least in part on performing the discovery procedure; and sending, in the response to the application client, an indication of the set of edge application servers received from the edge enabler server.

Aspect 7: The method of any of aspects 1 through 6, further comprising: determining that the discovery procedure failed to return an edge application server for at least one of the one or more services of the application client; performing, at the edge enabler client, a domain name system procedure to identify another server for the at least one of the one or more services of the application client based at least in part on the determining; and sending, in the response to the request, the internet protocol address of the other server based at least in part on performing the domain name system procedure.

Aspect 8: A method for wireless communication at a UE, comprising: sending, from an application client of the UE to an edge enabler client of the UE, a request to identify one or more edge application servers for one or more services of the application client; receiving, at the application client from the edge enabler client, a response to the request comprising at least one of the one or more edge application servers; and connecting to the at least one edge application server based at least in part on receiving the response.

Aspect 9: The method of aspect 8, further comprising: sending, in the request, a list of domain names for which the edge enabler client is to identify the one or more edge application servers; and receiving, in the response, an indication of a respective edge application server matched to each domain name of at least a subset of the list of domain names.

Aspect 10: The method of aspect 9, further comprising: identifying the list of domain names to include in the request based at least in part on one or more services in the application client marked as edge computing services.

Aspect 11: The method of any of aspects 9 through 10, further comprising: displaying, in the application client as edge computing services, the one or more services corresponding to the list of domain names included in the request.

Aspect 12: The method of any of aspects 9 through 11, further comprising: determining that the list of domain names for which the edge enabler client is to identify the one or more edge application servers is refreshed in the application client; and sending, from the application client to the edge enabler client, another request comprising the refreshed list of domain names for which the edge enabler client is to identify the one or more edge application servers based at least in part on the determining.

Aspect 13: The method of any of aspects 8 through 12, further comprising: sending, in the request, an indication of a profile of the application client; receiving, in the response, identifiers associated with a set of edge application servers available for the application client based at least in part on sending the indication; and matching each service of a subset of the one or more services to a respective edge application server in the set of edge application servers.

Aspect 14: The method of aspect 13, further comprising: displaying, in the application client as edge computing services, the subset of the one or more services matched to edge application servers in the set of edge application servers.

Aspect 15: A method for wireless communication at a UE, comprising: receiving, from an application client of the UE at an edge enabler client of the UE, a request to perform a domain name system procedure using a domain name associated with a service of the application client, wherein the edge enabler client operates as a domain name system client; performing, at the edge enabler client, a discovery procedure to identify an edge application server for the service of the application client based at least in part on receiving the request; and sending, to the application client from the edge enabler client, a response to the request indicating an internet protocol address of the edge application server for the service of the application client or an internet protocol address of another server for the service of the application client.

Aspect 16: The method of aspect 15, further comprising: determining that the discovery procedure failed to return the edge application server for the service of the application client; performing the domain name system procedure to identify the other server for the service of the application client based at least in part on the determining; and sending, in the response to the request, the internet protocol address of the other server for the service of the application client based at least in part on performing the domain name system procedure.

Aspect 17: The method of any of aspects 15 through 16, wherein the application client uses the response from the edge enabler client including the internet protocol address of the edge application server or the internet protocol address of the other server as a domain name system procedure resolution.

Aspect 18: An apparatus for wireless communication at a UE, comprising a processor; memory coupled with the processor; and instructions stored in the memory and executable by the processor to cause the apparatus to perform a method of any of aspects 1 through 7.

Aspect 19: An apparatus for wireless communication at a UE, comprising at least one means for performing a method of any of aspects 1 through 7.

Aspect 20: A non-transitory computer-readable medium storing code for wireless communication at a UE, the code comprising instructions executable by a processor to perform a method of any of aspects 1 through 7.

Aspect 21: An apparatus for wireless communication at a UE, comprising a processor; memory coupled with the processor; and instructions stored in the memory and executable by the processor to cause the apparatus to perform a method of any of aspects 8 through 14.

Aspect 22: An apparatus for wireless communication at a UE, comprising at least one means for performing a method of any of aspects 8 through 14.

Aspect 23: A non-transitory computer-readable medium storing code for wireless communication at a UE, the code comprising instructions executable by a processor to perform a method of any of aspects 8 through 14.

Aspect 24: An apparatus for wireless communication at a UE, comprising a processor; memory coupled with the processor; and instructions stored in the memory and executable by the processor to cause the apparatus to perform a method of any of aspects 15 through 17.

Aspect 25: An apparatus for wireless communication at a UE, comprising at least one means for performing a method of any of aspects 15 through 17.

Aspect 26: A non-transitory computer-readable medium storing code for wireless communication at a UE, the code comprising instructions executable by a processor to perform a method of any of aspects 15 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB). Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from an application client of the UE at an edge enabler client of the UE and via an interface between the application client and the edge enabler client, a request to identify one or more edge application servers for one or more services of the application client, the request including information associated with the one or more edge application servers and including a profile of the application client, and wherein the information in the request comprises a list of domain names for which to identify the one or more edge application servers;
      perform, at the edge enabler client and using the list of domain names, a discovery procedure to identify the one or more edge application servers based at least in part on the information and the profile of the application client included in the request;
      match each domain name of at least a subset of the list of domain names to a respective edge application server in a set of edge application servers; and
      send, to the application client from the edge enabler client, a response to the request based at least in part on performing the discovery procedure, wherein the response comprises an indication of the respective edge application server matched to each domain name.

2. The apparatus of claim 1, wherein the instructions are further executable by the processor to cause the apparatus to:
   receive, at the edge enabler client from an edge enabler server, identifiers associated with the set of edge application servers based at least in part on performing the discovery procedure.

3. The apparatus of claim 1, wherein the instructions are further executable by the processor to cause the apparatus to:
   store the list of domain names for which the edge enabler client is to identify the one or more edge application servers; and
   perform another discovery procedure using the list of domain names based at least in part on a change in location of the UE, an update to availability of the one or more edge application servers for the one or more services of the application client, or a combination thereof.

4. The apparatus of claim 1, wherein the profile of the application client includes one or more edge application server identifiers associated with the application client and one or more key performance indicators.

5. The apparatus of claim 4, wherein the instructions are further executable by the processor to cause the apparatus to:
   receive, at the edge enabler client from an edge enabler server, identifiers associated with the set of edge application servers based at least in part on performing the discovery procedure; and
   send, in the response to the application client, an indication of the set of edge application servers received from the edge enabler server.

6. The apparatus of claim 1, wherein the instructions are further executable by the processor to cause the apparatus to:
   determine that the discovery procedure failed to return an edge application server for at least one of the one or more services of the application client;
   perform, at the edge enabler client, a domain name system procedure to identify another server for the at least one of the one or more services of the application client based at least in part on the determining; and
   send, in the response to the request, an identifier of the other server based at least in part on performing the domain name system procedure.

7. An apparatus for wireless communication at a user equipment (UE), comprising:
   a processor;
   memory coupled with the processor; and
   instructions stored in the memory and executable by the processor to cause the apparatus to:
      receive, from an application client of the UE at an edge enabler client of the UE and via an interface between the application client and the edge enabler client, a request to perform a domain name system procedure using a domain name associated with a service of the application client, the request including information associated with one or more edge application servers, wherein the edge enabler client operates as a domain name system client, and wherein the edge enabler client receives the request based at least in part on intercepting the request transmitted by the application client;
      perform, at the edge enabler client, a discovery procedure to identify an edge application server for the service of the application client based at least in part on the information included in the request intercepted by the edge enabler client; and
      send, to the application client from the edge enabler client, a response to the request indicating an internet protocol address of the edge application server for the service of the application client or an internet protocol address of another server for the service of the application client.

8. The apparatus of claim 7, wherein the instructions are further executable by the processor to cause the apparatus to:
   determine that the discovery procedure failed to return the edge application server for the service of the application client;
   perform the domain name system procedure to identify the other server for the service of the application client based at least in part on the determining; and
   send, in the response to the request, the internet protocol address of the other server for the service of the application client based at least in part on performing the domain name system procedure.

9. The apparatus of claim 7, wherein the application client uses the response from the edge enabler client including the internet protocol address of the edge application server or the internet protocol address of the other server as a domain name system procedure resolution.

10. A method for wireless communication at a user equipment (UE), comprising:
receiving, from an application client of the UE at an edge enabler client of the UE and via an interface between the application client and the edge enabler client, a request to identify one or more edge application servers for one or more services of the application client, the request including information associated with the one or more edge application servers and including a profile of the application client, and wherein the information in the request comprises a list of domain names for which to identify the one or more edge application servers;
performing, at the edge enabler client and using the list of domain names, a discovery procedure to identify the one or more edge application servers based at least in part on the information and the profile of the application client included in the request;
matching each domain name of at least a subset of the list of domain names to a respective edge application server in a set of edge application servers; and
sending, to the application client from the edge enabler client, a response to the request based at least in part on performing the discovery procedure, wherein the response comprises an indication of the respective edge application server matched to each domain name.

11. The method of claim 10, further comprising:
receiving, at the edge enabler client from an edge enabler server, identifiers associated with the set of edge application servers based at least in part on performing the discovery procedure.

12. The method of claim 10, further comprising:
storing the list of domain names for which the edge enabler client is to identify the one or more edge application servers; and
performing another discovery procedure using the list of domain names based at least in part on a change in location of the UE, an update to availability of the one or more edge application servers for the one or more services of the application client, or a combination thereof.

13. The method of claim 10, wherein the profile of the application client includes one or more edge application server identifiers associated with the application client and one or more key performance indicators.

14. The method of claim 13, further comprising:
receiving, at the edge enabler client from an edge enabler server, identifiers associated with the set of edge application servers based at least in part on performing the discovery procedure; and
sending, in the response to the application client, an indication of the set of edge application servers received from the edge enabler server.

15. The method of claim 10, further comprising:
determining that the discovery procedure failed to return an edge application server for at least one of the one or more services of the application client;
performing, at the edge enabler client, a domain name system procedure to identify another server for the at least one of the one or more services of the application client based at least in part on the determining; and sending, in the response to the request, an identifier of the other server based at least in part on performing the domain name system procedure.

16. A non-transitory computer-readable medium storing code for wireless communication at a user equipment (UE), the code comprising instructions executable by a processor to:
receive, from an application client of the UE at an edge enabler client of the UE and via an interface between the application client and the edge enabler client, a request to identify one or more edge application servers for one or more services of the application client, the request including information associated with the one or more edge application servers and including a profile of the application client, and wherein the information in the request comprises a list of domain names for which to identify the one or more edge application servers;
perform, at the edge enabler client and using the list of domain names, a discovery procedure to identify the one or more edge application servers based at least in part on the information and the profile of the application client included in the request;
match each domain name of at least a subset of the list of domain names to a respective edge application server in a set of edge application servers; and
send, to the application client from the edge enabler client, a response to the request based at least in part on performing the discovery procedure, wherein the response comprises an indication of the respective edge application server matched to each domain name.

17. The non-transitory computer-readable medium of claim 16, wherein the instructions are further executable by the processor to:
receive, at the edge enabler client from an edge enabler server, identifiers associated with the set of edge application servers based at least in part on performing the discovery procedure.

18. The non-transitory computer-readable medium of claim 16, wherein the instructions are further executable by the processor to:
store the list of domain names for which the edge enabler client is to identify the one or more edge application servers; and
perform another discovery procedure using the list of domain names based at least in part on a change in location of the UE, an update to availability of the one or more edge application servers for the one or more services of the application client, or a combination thereof.

19. The non-transitory computer-readable medium of claim 16, wherein the profile of the application client includes one or more edge application server identifiers associated with the application client and one or more key performance indicators.

20. The non-transitory computer-readable medium of claim 19, wherein the instructions are further executable by the processor to:
receive, at the edge enabler client from an edge enabler server, identifiers associated with the set of edge application servers based at least in part on performing the discovery procedure; and
send, in the response to the application client, an indication of the set of edge application servers received from the edge enabler server.

21. The non-transitory computer-readable medium of claim 16, wherein the instructions are further executable by the processor to:

determine that the discovery procedure failed to return an edge application server for at least one of the one or more services of the application client;

perform, at the edge enabler client, a domain name system procedure to identify another server for the at least one of the one or more services of the application client based at least in part on the determining; and send, in the response to the request, an identifier of the other server based at least in part on performing the domain name system procedure.

* * * * *